Feb. 18, 1964 F. F. SCHLIEPHACKE 3,121,589
RECLINING CHAIR AND LEG-REST CONTROL ARRANGEMENT
Filed March 22, 1963 14 Sheets-Sheet 1
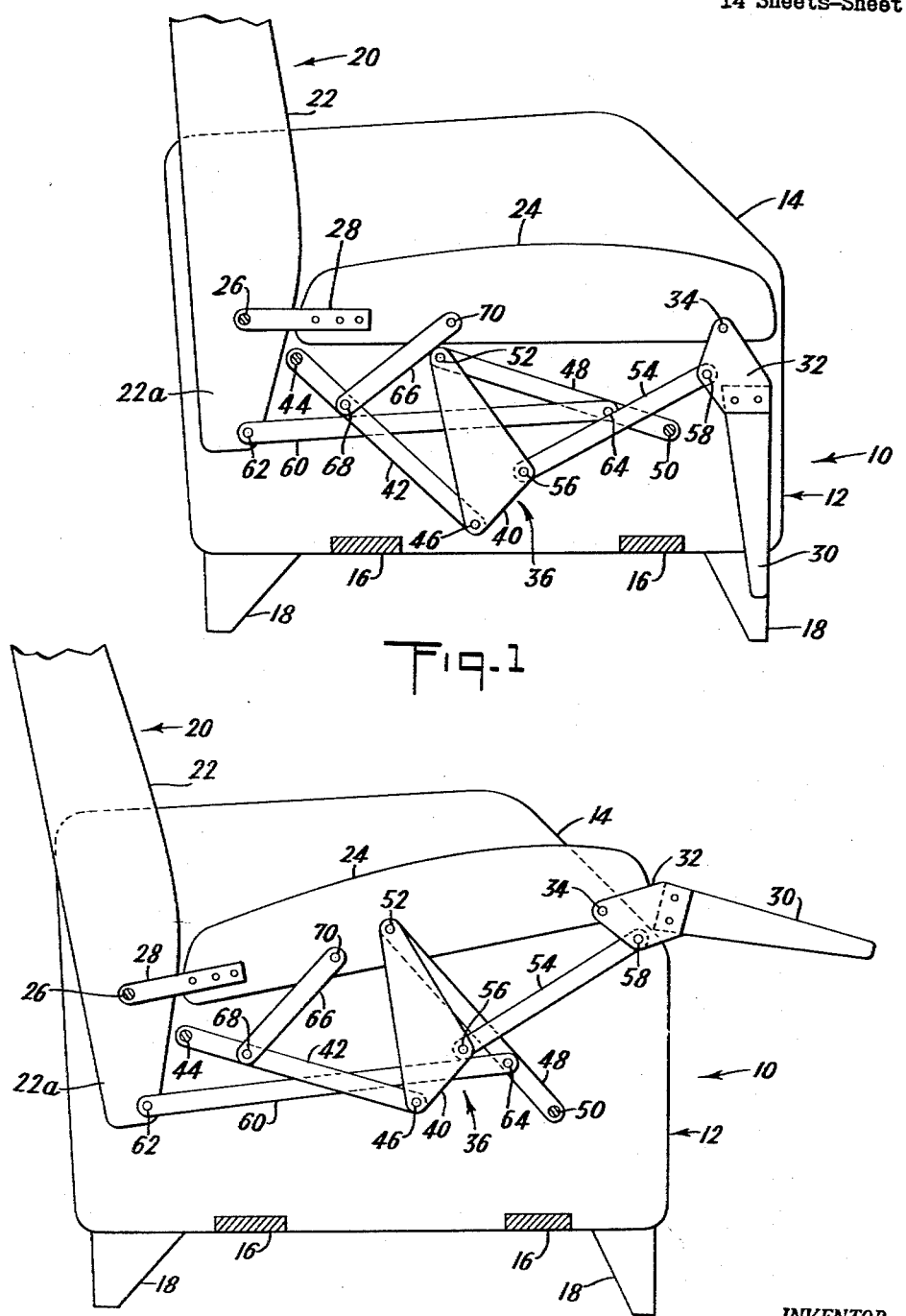
INVENTOR.
FRIDTJOF F. SCHLIEPHACKE
BY Ameter + Levy
ATTORNEYS INVENTOR.
FRIDTJOF F. SCHLIEPHACKE
BY
Amster + Levy
ATTORNEYS Feb. 18, 1964  F. F. SCHLIEPHACKE  3,121,589
RECLINING CHAIR AND LEG-REST CONTROL ARRANGEMENT
Filed March 22, 1963  14 Sheets-Sheet 4

INVENTOR.
FRIDTJOF F. SCHLIEPHACKE
BY
Amster + Levy
ATTORNEYS

INVENTOR
FRIDTJOF F. SCHLIEPHACKE
BY Amster + Levy
ATTORNEYS

Feb. 18, 1964  F. F. SCHLIEPHACKE  3,121,589
RECLINING CHAIR AND LEG-REST CONTROL ARRANGEMENT
Filed March 22, 1963  14 Sheets-Sheet 8

INVENTOR
FRIDTJOF F. SCHLIEPHACKE
BY *Amster & Levy*
ATTORNEYS

Feb. 18, 1964    F. F. SCHLIEPHACKE    3,121,589
RECLINING CHAIR AND LEG-REST CONTROL ARRANGEMENT
Filed March 22, 1963    14 Sheets-Sheet 10

INVENTOR
FRIDTJOF F. SCHLIEPHACKE
BY Amster + Levy
ATTORNEYS

Feb. 18, 1964 F. F. SCHLIEPHACKE 3,121,589
RECLINING CHAIR AND LEG-REST CONTROL ARRANGEMENT
Filed March 22, 1963 14 Sheets-Sheet 11

INVENTOR
FRIDTJOF F. SCHLIEPHACKE
BY Amster + Levy
ATTORNEYS

Feb. 18, 1964 F. F. SCHLIEPHACKE 3,121,589
RECLINING CHAIR AND LEG-REST CONTROL ARRANGEMENT
Filed March 22, 1963 14 Sheets-Sheet 12

INVENTOR
FRIDTJOF F. SCHLIEPHACKE
BY
Amatir + Levy
ATTORNEYS

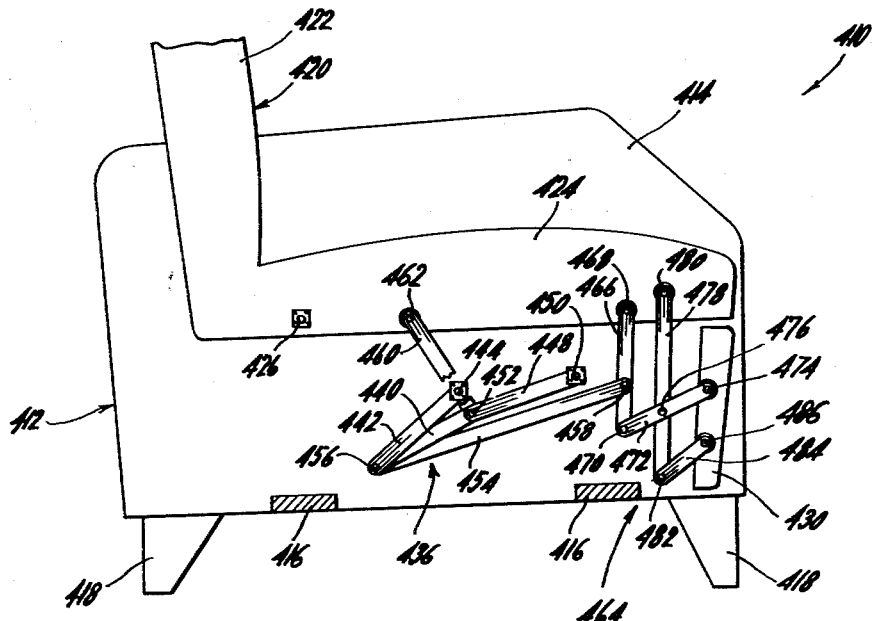

United States Patent Office 3,121,589
Patented Feb. 18, 1964

3,121,589
RECLINING CHAIR AND LEG-REST CONTROL
ARRANGEMENT
Fridtjof F. Schliephacke, Hundekehlenstrasse 18,
Berlin-Schmargendorf, Germany
Filed Mar. 22, 1963, Ser. No. 268,214
12 Claims. (Cl. 297—84)

The present invention relates to reclining chairs, and in particular to an improved control arrangement for a reclining chair of the type including body-supporting means movably mounted on a support and a leg-rest coordinated to move to elevated leg-supporting positions in response to movement of the body-supporting means. Advantageously, chairs according to the present invention are capable of attaining numerous desirable positions of the body-supporting means and the leg-rest for comfortably accommodating the chair occupant. This is a continuation-in-part of application Serial No. 840,728 filed September 17, 1959, and entitled "Improved Reclining Chair and Leg-Rest Control Arrangement."

The well known reclining chair includes a support, body-supporting means movably mounted on the support, and a leg-rest normally disposed in a stored position and movable to an elevated leg-supporting position incident to the continuous and uniform rearward movement of the body-supporting means. The body-supporting means may take the form of either a unitary or rigid body-supporting unit, or a separate seat and separate back-rest mounted for inclining and reclining movement respectively. The body-supporting means and the leg-rest are coordinated such that for each increment of such continuous and uniform movement of the body-supporting means rearwardly to various reclining positions, there is a corresponding continuous and uniform movement of the leg-rest toward the elevated leg-supporting position. These chairs are arranged such that the leg-rest arrives at the required elevated leg-supporting position when the body-supporting means has moved to the fully reclined position. In such a typical chair, the back-rest is moved continuously to an angle of approximately 45° to the floor line to establish the fully reclined position for the chair, while the leg-rest is moved continuously, but at approximately twice the speed, to establish the leg-supporting position substantially horizontal and parallel to the floor line, with the seat either maintaining a rigid relationship to the back-rest or being inclined continuously such that the included angle between the seat and back-rest is increased in the fully reclined position. As a practical matter, the leg-rest should not move beyond the horizontal attitude relative to the floor in the fully reclined position, or beyond a prescribed orientation in relation to the seat, in that the legs should be accommodated in an elevated, but slightly bent, position for optimum comfort. As is generally understood, the reason for elevating the legs in the first instance is to afford maximum comfort and to avoid the undesirable physiological effects incident upon the legs hanging down when the chair occupant attempts to be comfortable or to relax. Thus, in a well constructed single movement reclining chair of conventional design, although there are many intermediate positions between the upright or sitting position and the fully reclined position, as a practical matter the only position appropriate for proper relaxation is the fully reclined position, or one close thereto, wherein the leg-rest is sufficiently elevated to appropriately support the legs of the chair occupant.

Of recent times there has been developed the multiple movement reclining chair which is specifically designed to attain at least one intermediate selected position in which the leg-rest is elevated and serves the leg-supporting function properly. Such multiple movement chairs may be of the type incorporating a unitary body-supporting unit wherein there are first and second movement phases. During the first movement phase, the unit moves from an upright sitting position with the leg-rest stored to an intermediate, tilted sitting position with the leg-rest elevated; and during the second movement phase, the unit moves from the intermediate, tilted sitting position through various reclining positions to a fully reclined position, with the leg-rest remaining in a substantially fixed elevated leg-supporting position relative to the seat. Further, such chairs may be of the type incorporating a body-supporting means including a movable seat and movable back-rest wherein there are first and second movement phases. During the first movement phase the body-supporting means moves from an upright sitting position to an intermediate, tilted sitting position with substantially no change in the angular relationship between the seat and back-rest, with the leg-rest moving into an elevated position; and during the second movement phase the body-supporting means moves from the intermediate, tilted sitting position through a series of reclining positions to a fully reclined position, with the leg-rest remaining elevated relative to the seat and with an increase in the angular relationship between the seat and back-rest. Inherently such multiple movement reclining chairs are relatively complicated and expensive to construct, and usually require special provision to establish the order of or sequence of operations for the movable components of the chair.

Broadly, it is an object of the present invention to provide an improved reclining chair of the multiple position or multiple movement type which is capable of attaining one or more intermediate positions in which the legs of the chair occupant are elevated. Specifically it is within the contemplation of the present invention to provide an improved leg-rest control arrangement for a reclining chair which enables the establishment of a number of intermediate selected positions wherein the body-supporting means and leg-rest of the chair are optimumly positioned relative to each other and to the chair frame or support for comfortably accommodating the chair occupant in attitudes appropriate for television viewing, reading, sewing or the like, and/or complete relaxation.

I have found that by controlling the rate of elevation of the leg-rest, it is possible to establish multiple positions for a chair in which the body-supporting means is continuously moved and is properly positioned relative to the support for establishing successive desired attitudes for the chair occupant; and in such successive attitudes, the leg-rest is always appropriately elevated for the optimum leg-supporting function. In particular, the leg-rest is elevated at a substantially uniform rate during a first phase or portion of the movement of the body-supporting means relative to the support to bring the leg-rest quickly to the desired elevated leg-supporting position; thereafter as the body-supporting means moves through a second phase or portion of movement toward the fully reclined position, the leg-rest slows down so as to maintain its optimum position, it being recalled that the leg-rest must remain substantially in a horizontal position relative to the floor line and in a required relationship to the seat which simultaneously is moved into various inclined positions. Advantageously, provision may be made such that the retardation of the rate of movement of the leg-rest during the second phase or portion of movement of the body-supporting means brings about a decrease, rather than a further increase, in the angle between the leg-rest and seat during the latter portion of the second phase, such that an optimum position for the leg-rest may be established when the body-supporting unit moves into the fully reclined position.

In accordance with an illustrative embodiment demonstrating features and advantages of the present invention, my reclining chair comprises a support, a body-supporting means including a back-rest and seat movably mounted on the support for continuous and uniform movement from a sitting position through intermediate positions to a fully reclined position, a leg-rest mounted for movement into various elevated leg-supporting positions, and leg-rest actuating means for moving the leg-rest to a first prescribed elevated leg-supporting position in response to a first phase or portion of the movement of the body-supporting means. The leg-rest actuating means includes a control member, respective first and second suspending means mounted on the support and having first and second pivotal connections to the control member for mounting the same for displacement relative to the support, and coupling means operatively connected to the leg-rest and to the control member at a control pivot. The control pivot is positioned on the control member and the control member is suspended such that the control pivot moves rapidly at a substantially uniform rate in response to a first phase or portion of the movement of the body-supporting means to bring about a rapid movement of the leg-rest to the prescribed elevated leg-supporting position. Further, the control pivot is positioned on the control member and the control member is suspended such that the control pivot has a further motion in response to an initial increment of a second phase or portion of the movement of the body-supporting means during which the rate of movement of the control pivot is retarded to slow down the rate of elevation of the leg-rest from that which it experienced during the first phase of movement of the body-supporting means, so as to establish a second elevated leg-supporting position of the leg-rest wherein it remains substantially parallel to the floor.

As a feature of the invention, the control pivot can be positioned on the control member and the control member can be mounted such that the retardation in rate of movement of the leg-rest during the second phase of movement of the body-supporting means brings about a decrease in the angle between the leg-rest and seat during the latter portion of such second phase such that an optimum elevated leg-supporting position for the leg-rest is maintained as the body-supporting means moves into the fully reclined position.

Advantageously, the improved leg-rest control arrangement of the present invention finds useful application in reclining chairs of the rester type including a unitary back-rest and seat mounted on the support for continuous and uniform movement into various tilted positions and also reclining chairs of the lounger type constructed with a movable seat and movable back-rest mounted on the support for continuous and uniform inclining and reclining movement respectively.

The above brief description, as well as other features and advantages of the present invention, will be more fully appreciated by reference to the following detailed description of several illustrative embodiments according to the present invention, when taken in conjunction with the accompanying drawings, wherein:

FIG. 1 is a side elevational view, with the adjacent sdie frame broken away and with parts sectioned, showing a reclining chair of the lounger type demonstrating features of the present invention, with the chair shown in the upright, sitting position;

FIG. 2 is a side elevational view similar to FIG. 1, but showing the chair in a first intermediate position, with the leg-rest in an elevated leg-supporting position;

Figure 3:
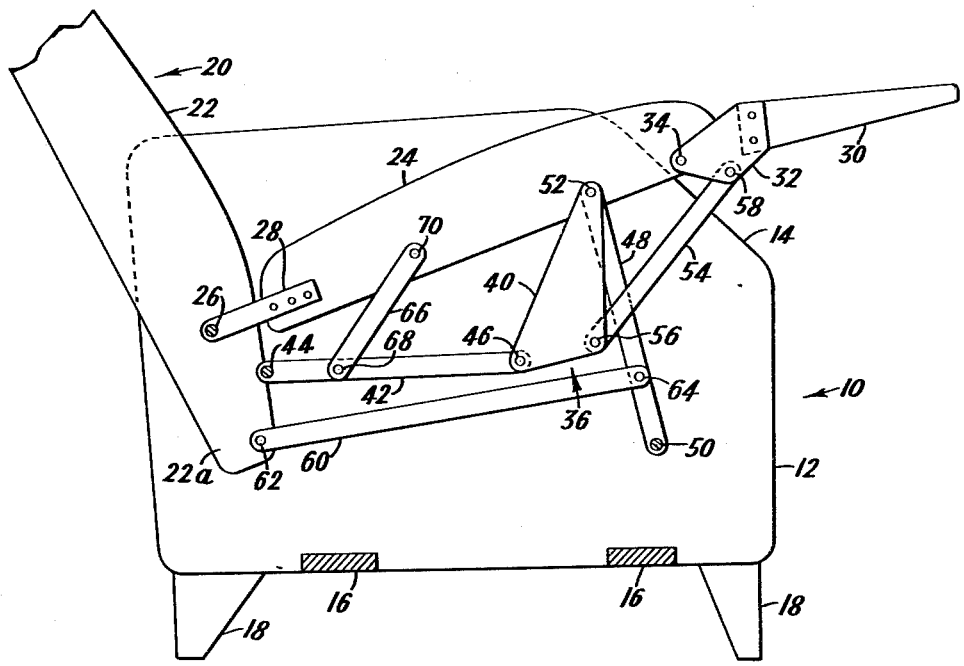
FIG. 3 is a side elevational view similar to FIG. 2 but showing the chair in a further intermediate position, with the leg-rest in an elevated leg-supporting position.
Figure 4:
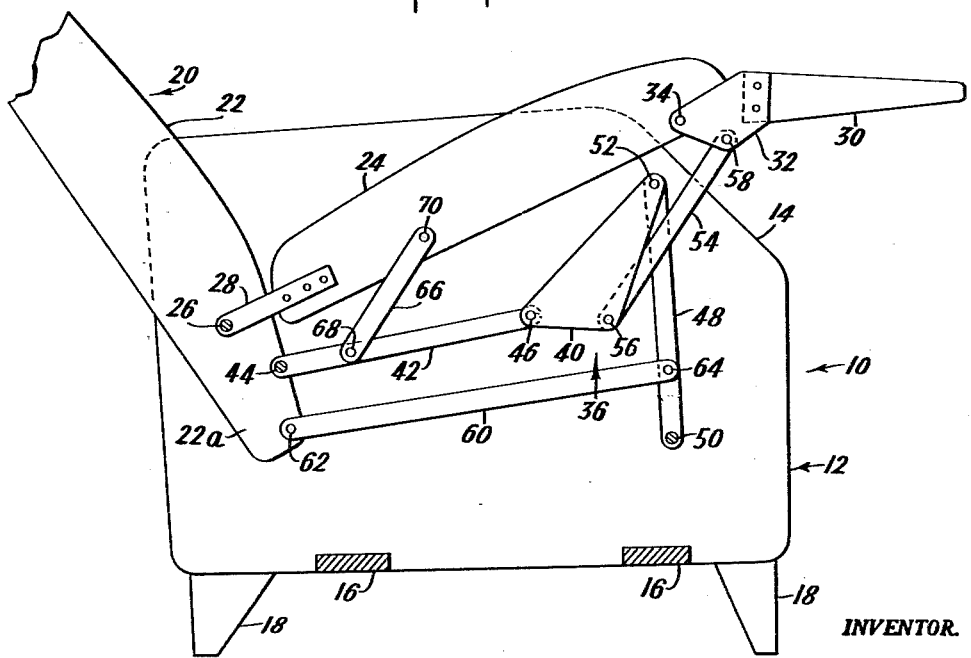
FIG. 4 is a side elevational view similar to FIG. 3, but showing the reclining chair in a fully reclined position, with the leg-rest in an elevated leg-supporting position.
Figure 5:
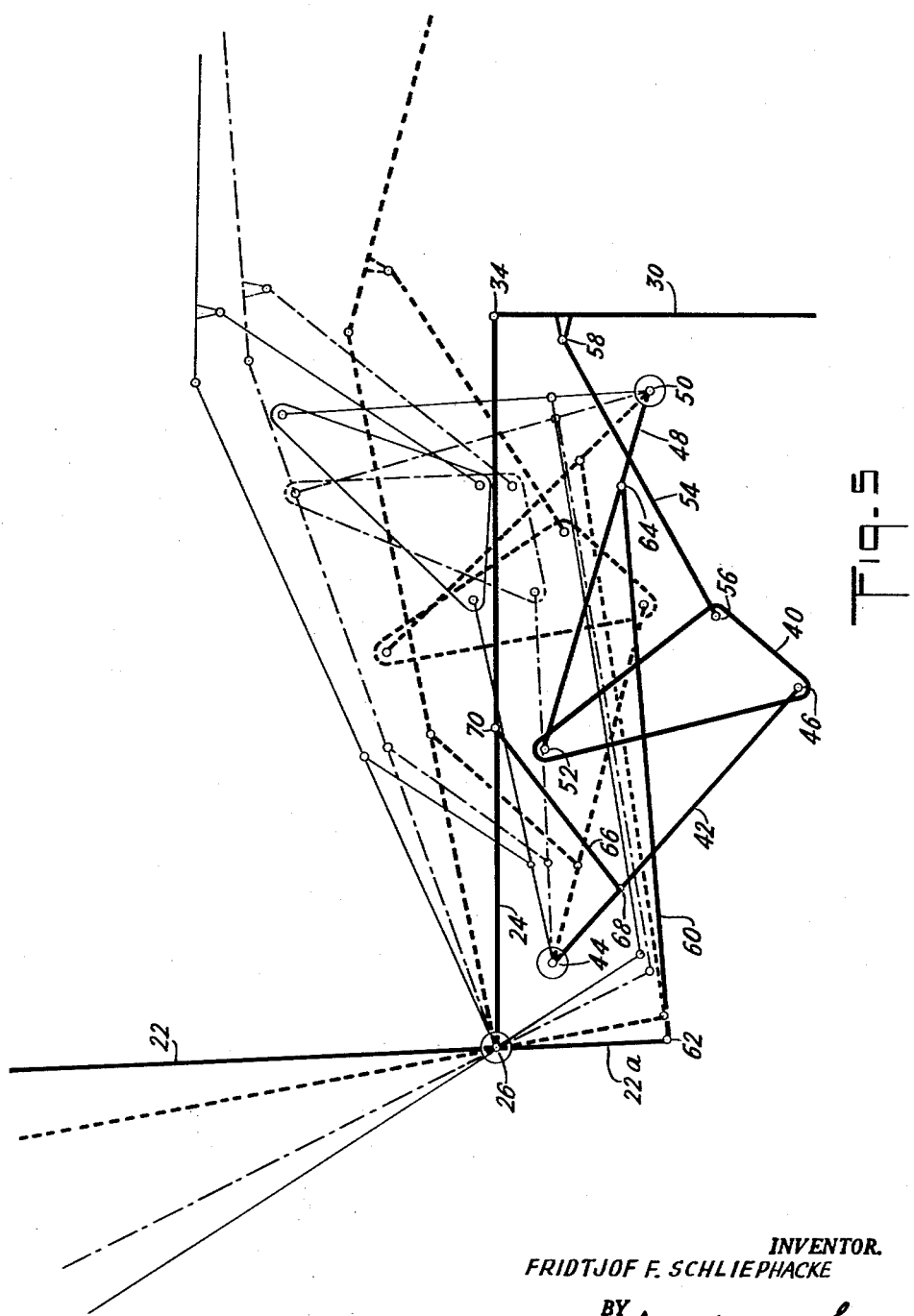
Figure 6:
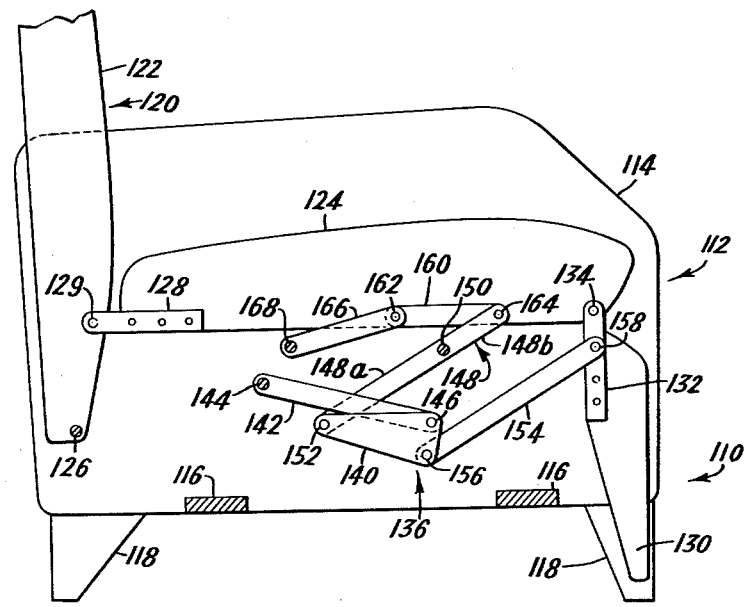
Figure 7:
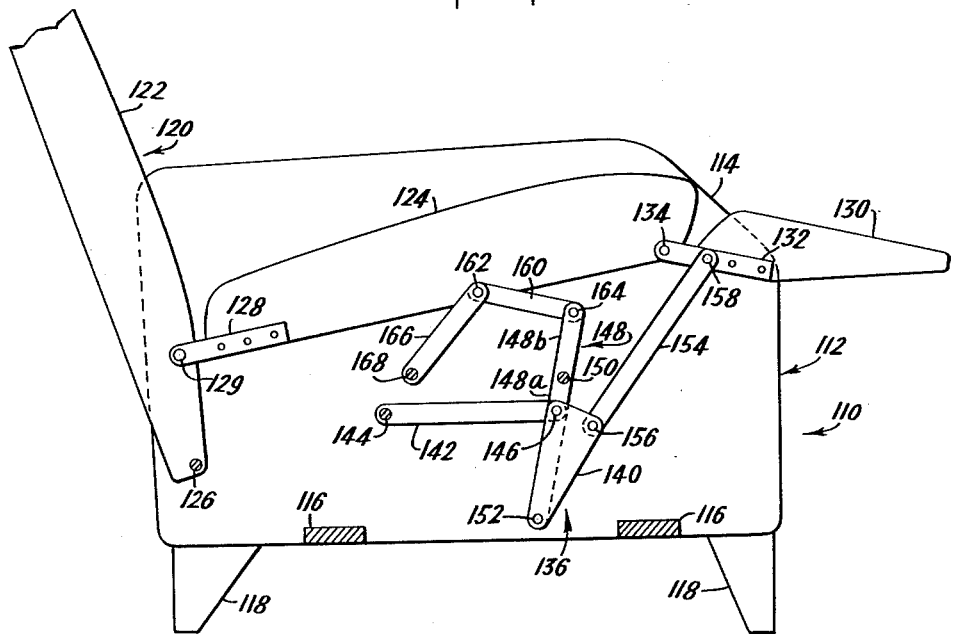
Figure 8:
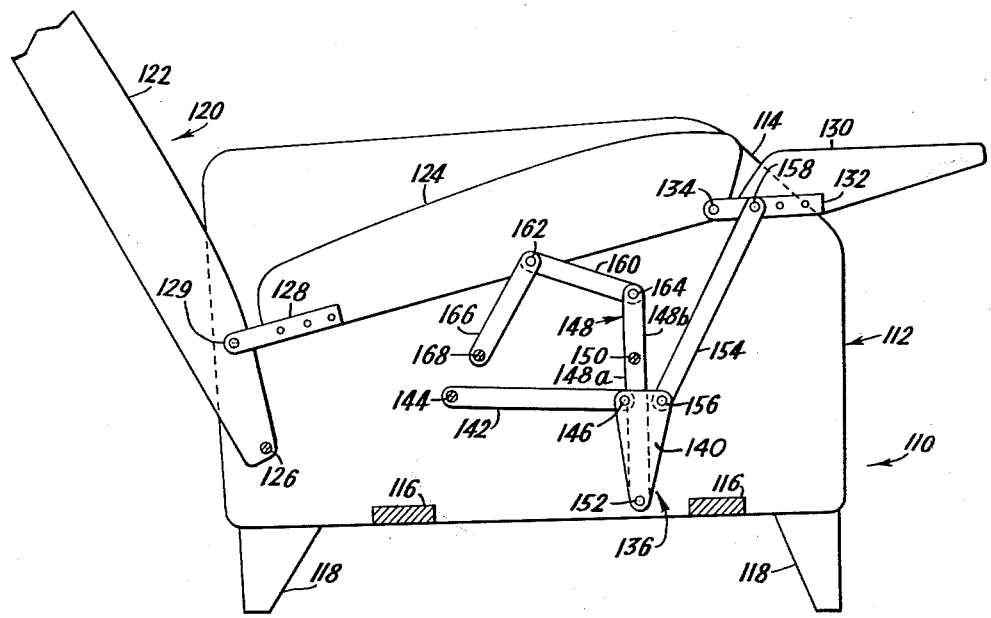
Figure 9:
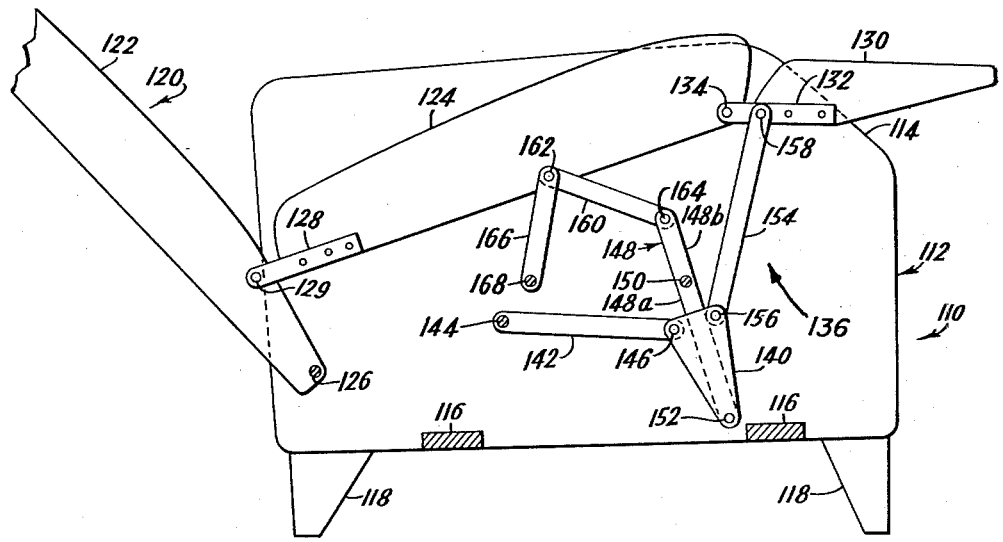
Figure 10:
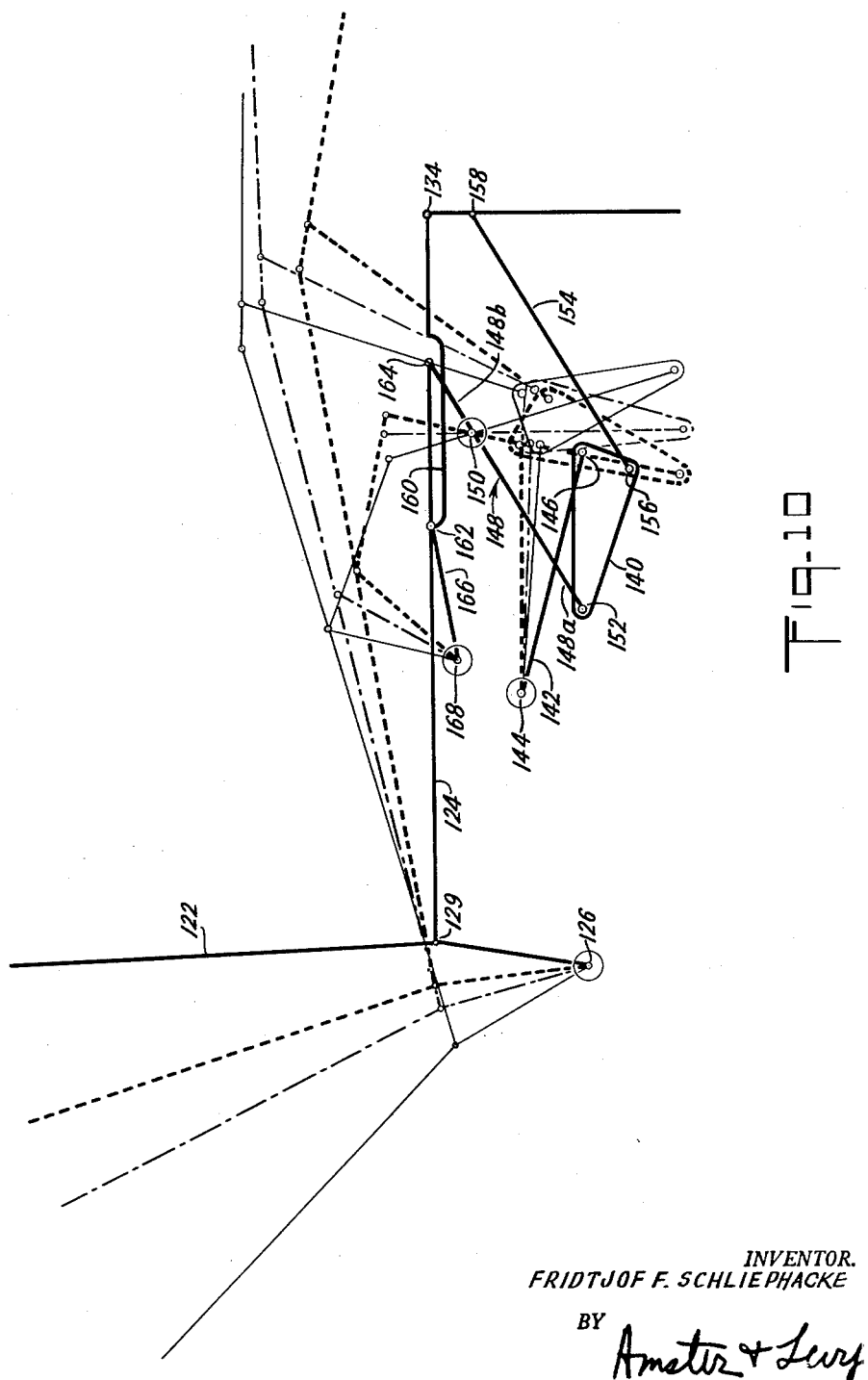
Figure 11:
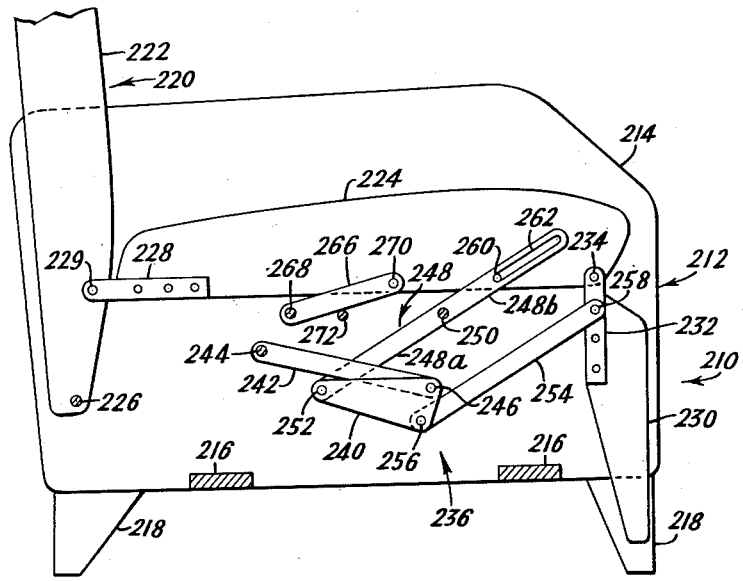
Figure 12:
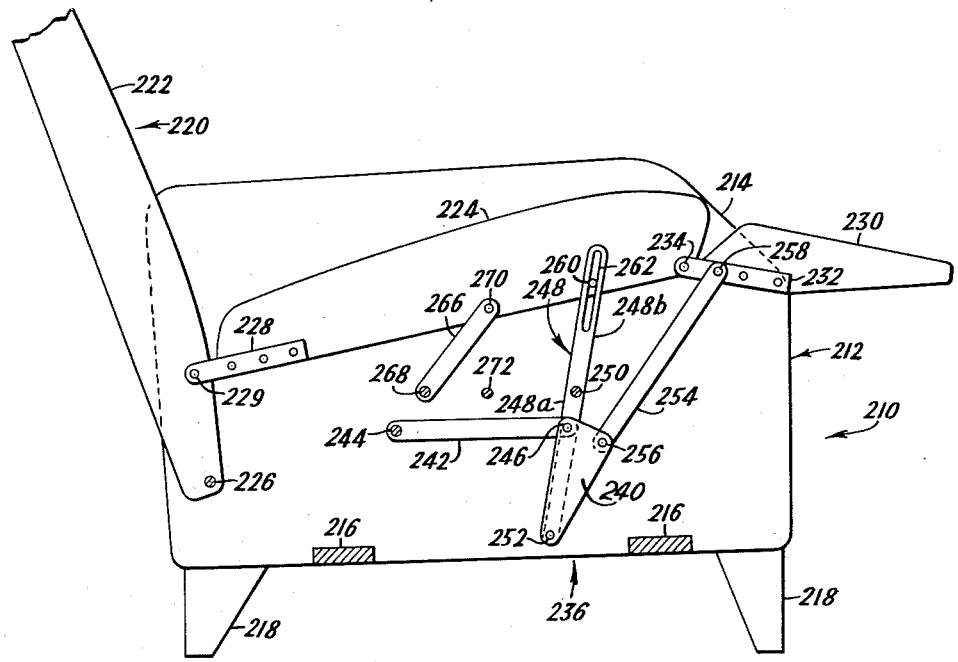
Figure 13:
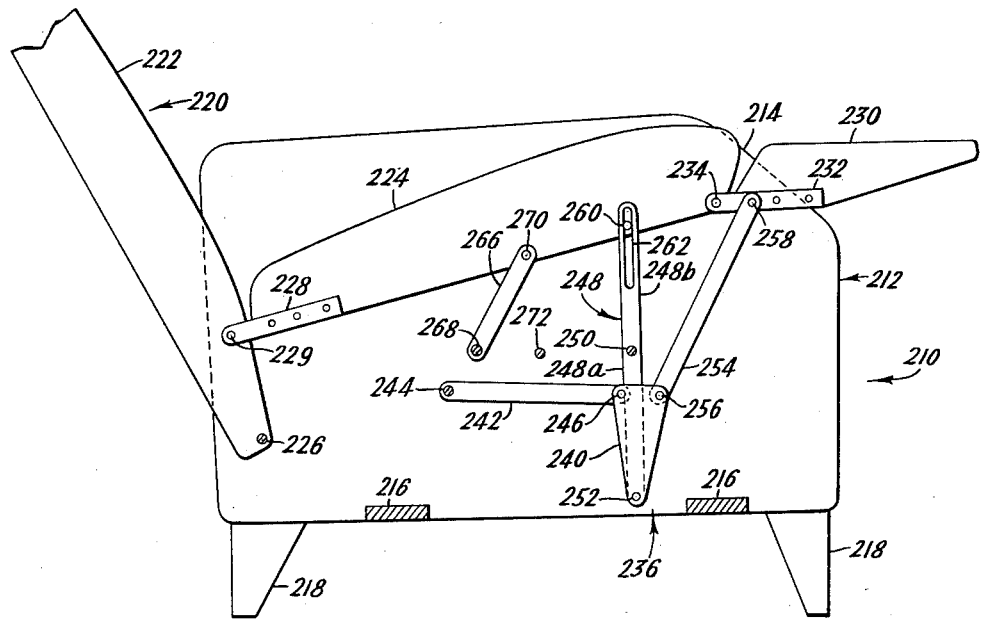
Figure 14:
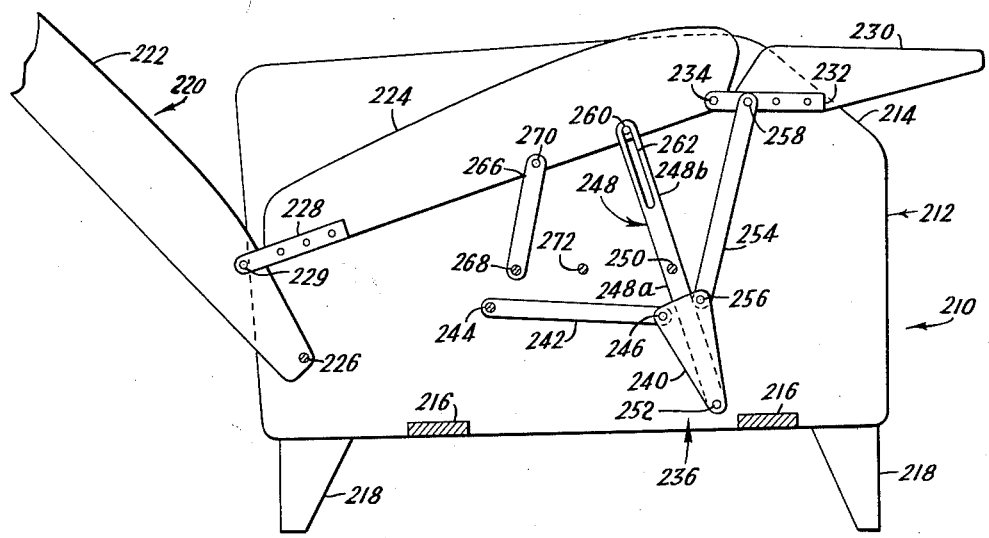
Figure 15:
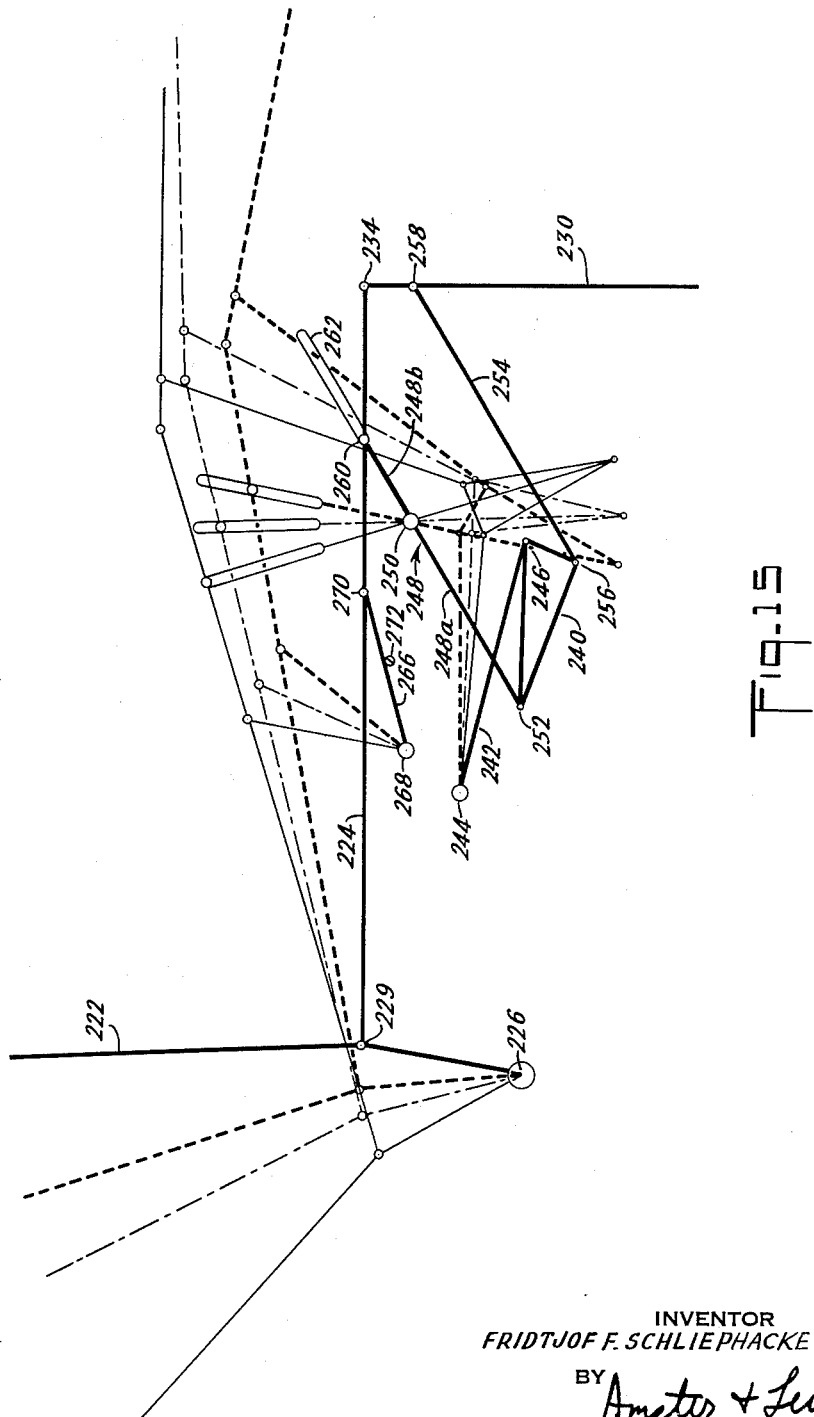
Figure 16:
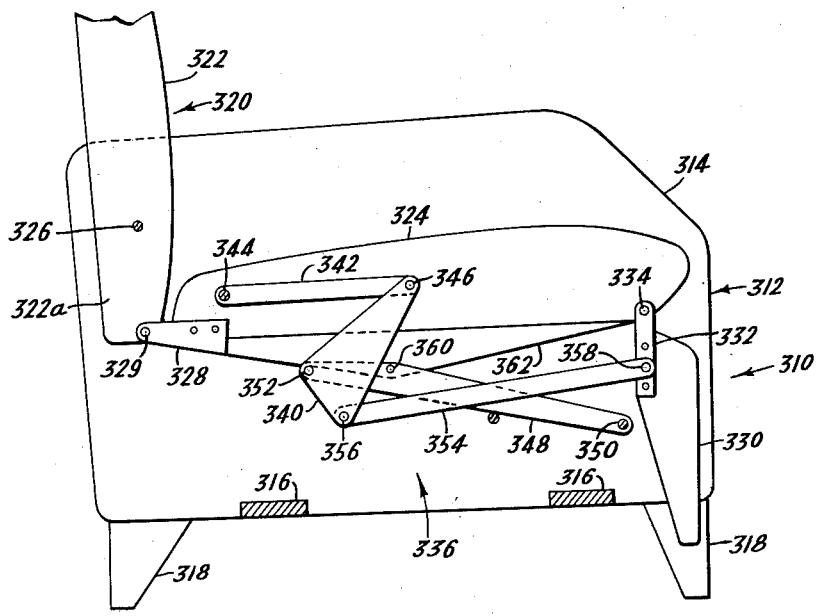
Figure 17:
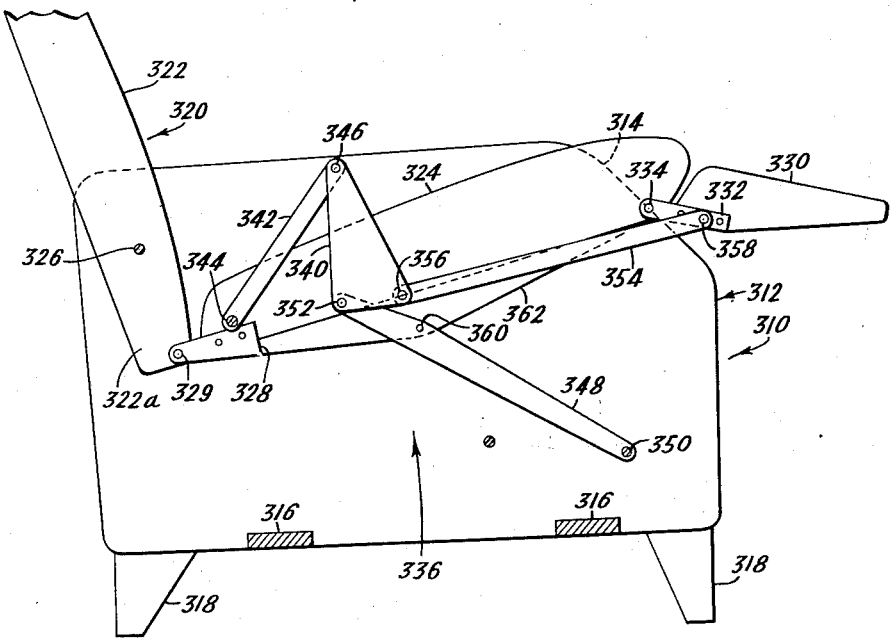
Figure 18:
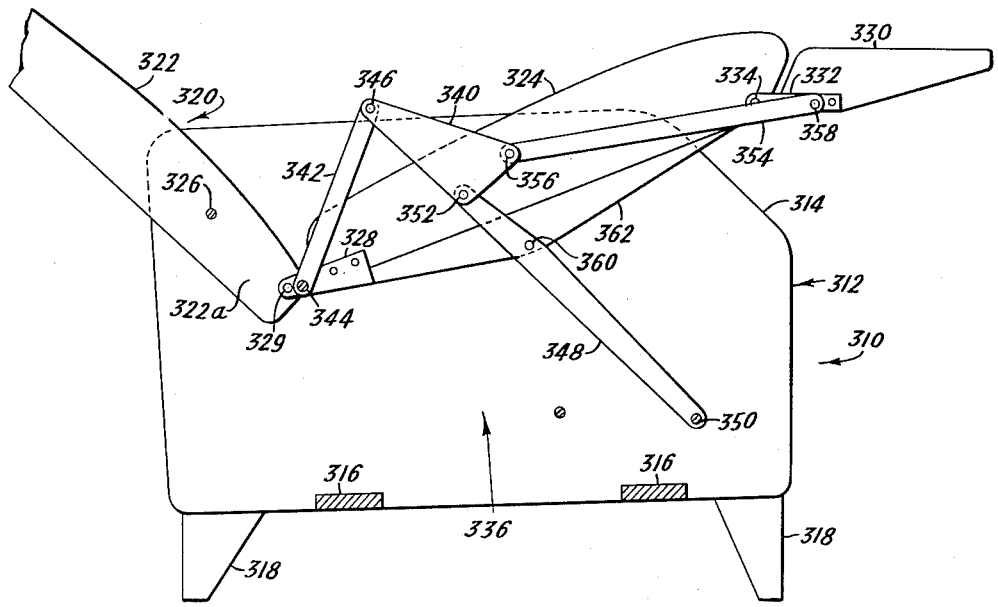
Figure 19:
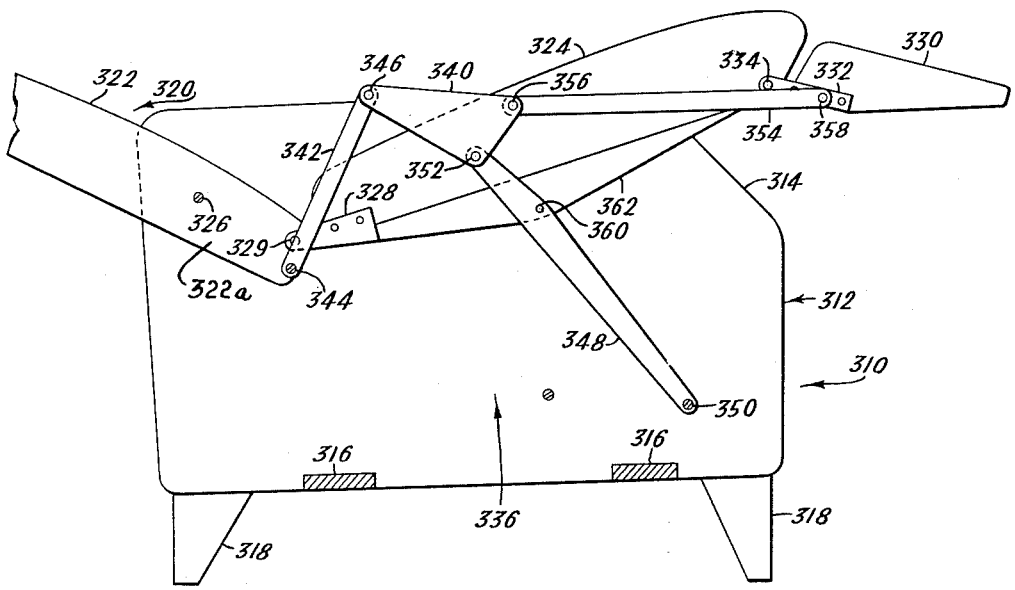
Figure 20:
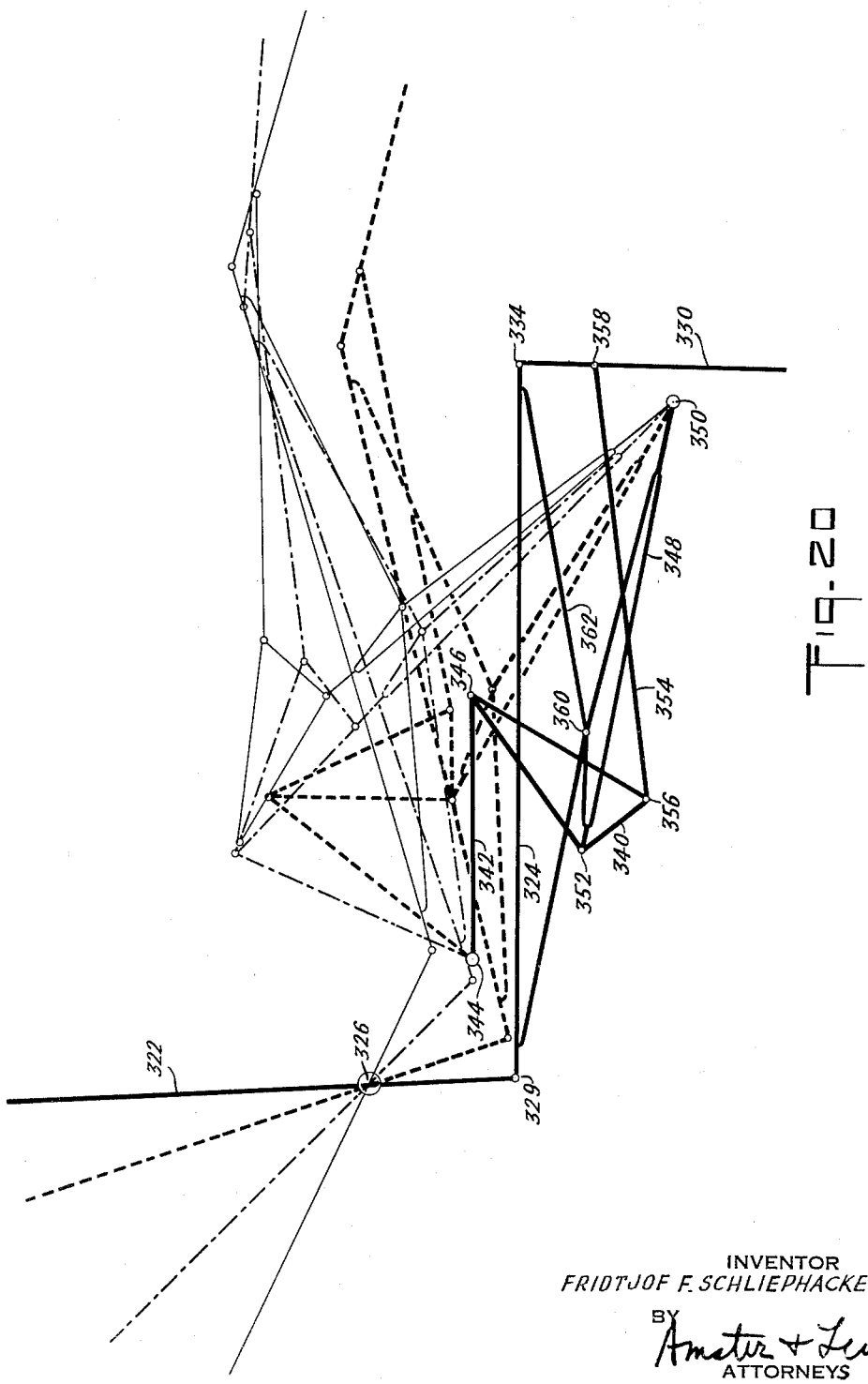
Figure 23:
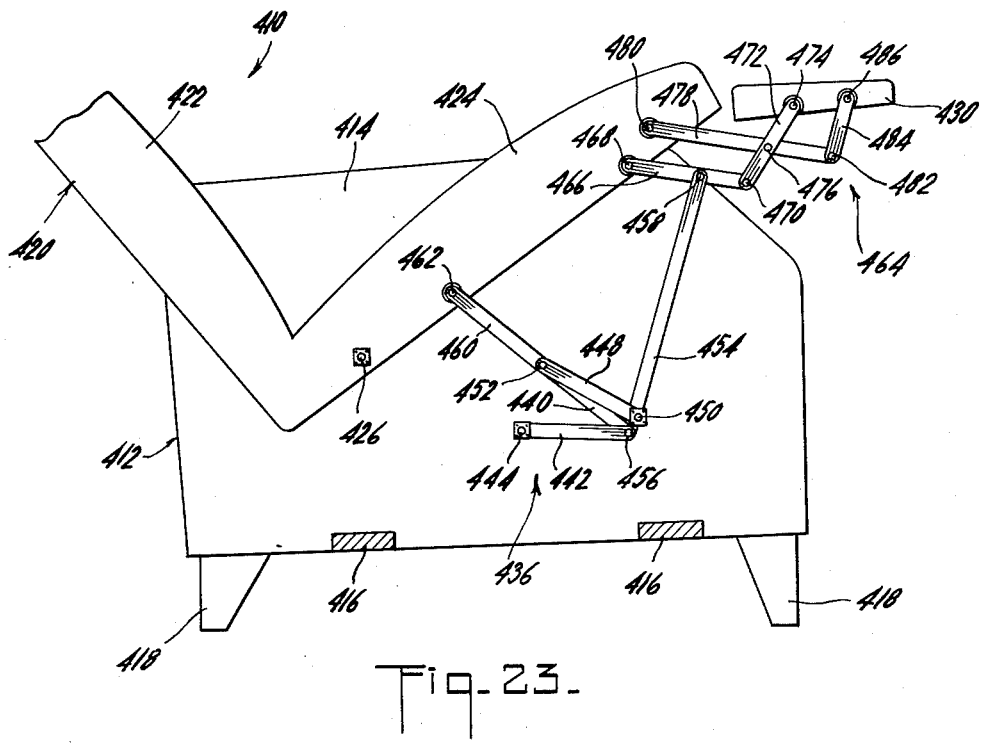
Figure 24:
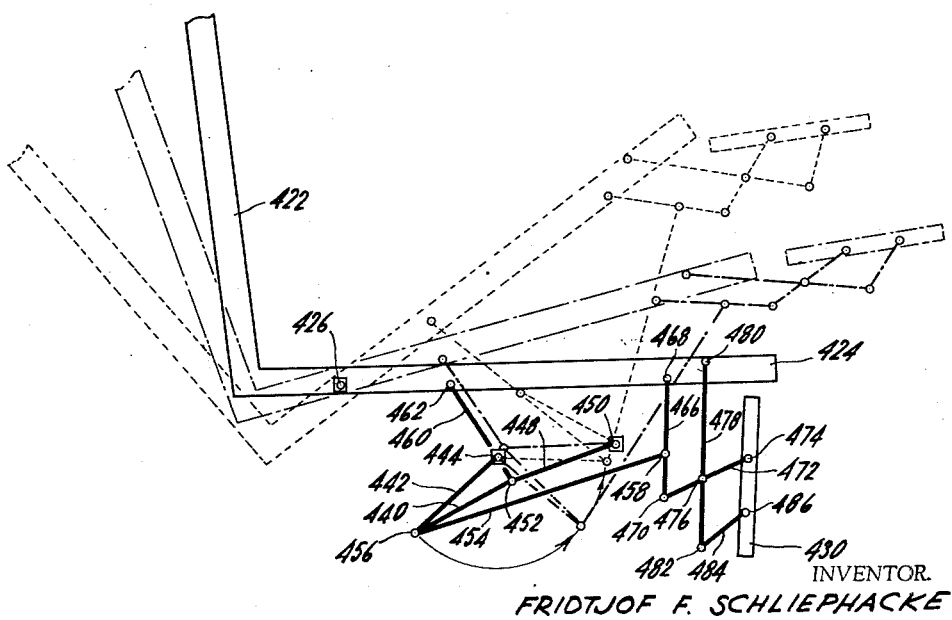

FIG. 5 is a composite diagrammatic showing of FIGS. 1 to 4 inclusive, with the upright sitting position of FIG. 1 shown by the heavy full line, with the first intermediate position of FIG. 2 shown by the somewhat lighter dash line, wtih the second intermediate position of FIG. 3 shown by the still lighter dot-dash line, and with the fully reclined position of FIG. 4 shown by the lightest full line;

FIG. 6 is a side elevational veiw, wtih the adjacent side frame broken away and with parts sectioned, showing a reclining chair of the lounger type demonstrating features of the present invention, with the chair shown in the upright sitting position;

FIG. 7 is a side elevational view similar to FIG. 6, but showing the chair in a first intermediate position, with the leg-rest in an elevated leg-supporting position;

FIG. 8 is a side elevational view similar to FIG. 7, but showing the chair in a further intermediate position, with the leg-rest in an elevated leg-supporting position;

FIG. 9 is a side elevational view similar to FIG. 8, but showing the reclining chair in a fully reclined position, with the leg-rest in an elevated leg-supporting position;

FIG. 10 is a composite diagrammatic showing of FIGS. 6 to 9 inclusive, with the upright sitting position of FIG. 6 shown by the heavy full line, with the first intermediate position of FIG. 7 shown by the somewhat lighter dash line, with the second intermediate position of FIG. 8 shown by the still lighter dot-dash line, and with the fully reclined position of FIG. 9 shown by the lightest full line;

FIG. 11 is a side elevational view, with the adjacent side frame broken away and with parts sectioned, showing a reclining chair of the lounger type demonstrating features of the present invention, with the chair shown in the upright sitting position;

FIG. 12 is a side elevational view similar to FIG. 11, but showing the chair in a first intermediate position, with the leg-rest in an elevated leg-supporting position;

FIG. 13 is a side elevational view similar to FIG. 12, but showing the chair in a further intermediate position, with the leg-rest in an elevated leg-supporting position;

FIG. 14 is a side elevational view similar to FIG. 13 but showing the reclining chair in a fully reclined position, with the leg-rest in an elevated leg-supporting position;

FIG. 15 is a composite diagrammatic showing of FIGS. 11 to 14 inclusive, with the upright sitting position of FIG. 11 shown by the heavy full line, with the first intermediate position of FIG. 12 shown by the somewhat lighter dash line, with the second intermediate position of FIG. 13 shown by the still lighter dot-dash line, and with the fully reclined position of FIG. 14 shown by the lightest full line;

FIG. 16 is a side elevational view, with the adjacent side frame broken away and with parts sectioned, showing a reclining chair of the lounger type demonstrating features of the present invention, with the chair shown in the upright sitting position;

FIG. 17 is a side elevational view similar to FIG. 16, but showing the chair in a first intermediate position, with the leg-rest in an elevated leg-supporting position;

FIG. 18 is a side elevational view similar to FIG. 17, but showing the chair in a further intermediate position, with the leg-rest in an elevated leg-supporting position;

FIG. 19 is a side elevational view similar to FIG. 18, but showing the reclining chair in a fully reclined position, with the leg-rest in an elevated leg-supporting position;

FIG. 20 is a composite diagrammatic showing of FIGS. 16 to 19 inclusive, with the upright sitting position of FIG. 16 shown by the heavy full line, with the first intermediate position of FIG. 17 shown by the somewhat lighter dash line, with the second intermediate position of FIG. 18 shown by the still lighter dot-dash line, and with the fully reclined position of FIG. 19 shown by the lightest full line;

FIG. 21 is a side elevational view, with the adjacent side frame broken away and parts sectioned, showing a reclining chair of the restor type demonstrating features of the present invention, shown in the upright sitting position;

FIG. 22 is a side elevational view, similar to FIG. 21, but showing the chair in an intermediate tilted position;

FIG. 23 is a side elevational view similar to FIG. 22, but showing the chair in a further tilted position, with the leg-rest in an elevated leg-supporting position; and, FIG. 24 is a composite diagrammatic showing of FIGS. 21 to 23 inclusive, with the upright sitting position of FIG. 21 shown by the heavy full line, with the intermediate, tilted position of FIG. 22 shown by the somewhat lighter dash line, and with the further tilted position of FIG. 23 shown by the lightest full line.

Referring now specifically to the drawings, there is shown in FIGS. 1 to 5 inclusive a first embodiment of reclining chair demonstrating features of the present invention, generally designated by the reference numeral 10, which includes a support or frame 12 having opposite side walls 14 interconnected by suitable cross braces 16 and supported on depending legs 18.

A body-supporting means, generally designated by the reference numeral 20 and including a back-rest 22 and a seat 24, is mounted on the support 12 for continuous and uniform movement from the upright sitting position illustrated in FIG. 1 through numerous intermediate positions (selected ones being illustrated in FIGS. 2 and 3) into the reclining position illustrated in FIG. 4. In this illustrative embodiment the back-rest 22 includes a depending extension 22a and is mounted on the support 12 at a back-rest pivot 26 for reclining movement, and the seat 24 is mounted by means of rearwardly directed rigid hanger 28 for inclining movement about a seat pivot on the support 12 which is coaxial with the back-rest pivot 26.

Disposed beneath the forward end of the seat 24 in a depending stored position is a leg-rest 30 which is mounted for movement at varying rates from the stored position illustrated in FIG. 1 to elevated leg-supporting positions illustrated in FIGS. 2, 3 and 4. In this illustrative embodiment, the leg-rest 30 is mounted for movement into the successive elevated leg-supporting positions by a hanger arm or plate 32 which is rigidly connected to the upper end of the leg-rest 30 and is mounted on the seat 24 at a hanger pivot 34.

In the usual continuous and uniform single movement chair which includes a back-rest 22, seat 24 and leg-rest 30 mounted substantially as described hereinbefore, the coordinating mechanism is such that for each increment of the continuous and uniform reclining movement of the back-rest 22 there would be a corresponding continuous and uniform inclining movement of the seat 24 at its appropriate rate and a corresponding continuous and uniform elevating movement of the leg-rest 30 at its appropriate rate. The included angle between the seat and back-rest would increase as a function of the reclining movement as a result of the different rates in their continuous movement, and the leg-rest would be elevated, with the leg-rest arriving at the requisite elevated leg-supporting position, when the chair reached the fully reclined position (see FIG. 4). Thus, as a practical matter, the leg-rest would not be effectively positioned for the leg-supporting function during the numerous intermediate positions and would not be so positioned until the chair occupant brought the chair close to or into the fully reclined position. However, as will now be described, provision is made, by an improved leg-rest control arrangement 36 in accordance with the present invention, to rapidly bring the leg-rest 30 into an elevated leg-supporting position extending forwardly of the seat 24 and closely approaching a horizontal attitude relative to the floor in response to a first portion or phase of the movement of the body-supporting means 20. For example, as shown in FIG. 2 the back-rest 22 is reclined through approximately one fourth of its total movement, yet the leg-rest 30 is swung through between 70° and 80° relative to its original stored position and is already close to an optimum leg-supporting position. In the position illustrated in FIG. 2, it will be appreciated that the body-supporting means 20 is only slightly tilted back appropriate for television viewing, sewing, reading and the like, yet the leg-rest 30 is elevated into a useful leg-supporting position. During such first phase or portion of the reclining movement, the leg-rest control arrangement 36 elevates the leg-rest 30 at a substantially uniform rate of such proper magnitude and duration to achieve the requisite degree of elevation of the leg-rest 30 in response to a relatively small increment of reclining movement of the back-rest 22.

During the first increment of the second phase or portion of the continuous reclining movement of the back-rest 22, as may be appreciated by progressively inspecting FIGS. 2 and 3 and which is illustrated herein as being approximately twice the angular traverse of the first portion or increment, continued movement of the leg-rest 30 at the same substantially uniform rate of movement would bring the leg-rest 30 to a position inclined upwardly from the substantially horizontal attitude and inclined upwardly relative to the seat 24. Such position could not be tolerated for the legs of the chair occupant obviously cannot be moved into such an over-elevated position without causing such occupant discomfort. However, during the second phase or portion of the reclining movement of the back-rest 22, the rate of movement of the leg-rest 30 is retarded so that there is a relatively small elevating movement of the leg-rest 30 out of the elevated leg-supporting position shown in FIG. 2 into the further elevated leg-supporting position shown in FIG. 3 wherein the leg-rest is slightly inclined near the horizontal and is in the requisite relationship to the seat 24. Effectively during the portion of chair movement between the illustrative intermediate positions of FIGS. 2 and 3, the elevation of the leg-rest 30 is retarded or slowed down, althought the leg-rest 30 does move somewhat more into alignment with the seat 24.

During the final increment of the second phase or portion of the continuous reclining movement of the back-rest 22, the change in the rate of elevation of the leg-rest 30 is such as to decrease the included angle between the leg-rest 30 and the seat 24, such included angle being measured by drawing a reference line through the pivots 26, 34 and a further reference line from the pivot 34 along the length of the leg-rest 30. Effectively, during the latter part of the second movement phase, the leg-rest 30 lags and in a sense tends to reverse its movement relative to the seat 24 which continues to move upwardly into the final inclined attitude for the fully reclined position of the chair, as shown in FIG. 4.

By way of summary, it will be appreciated that the leg-rest control arrangement 36 is effective to establish different rates of movement of the leg-rest 30, with the illustrative chair including essentially two phases of movement. The relative small first phase of movement of the back-rest 22 rapidly brings the leg-rest 30 to an elevated leg-supporting position (compare FIGS. 1 and 2). Initially, the second phase of movement of the back-rest 22 effects a retardation of the motion of the leg-rest 30 so that the leg-rest 30 remains close to the required horizontal attitude (compare FIGS. 2 and 3). The final portion of the second phase of movement of the back-rest 22 brings about an increase in the included angle between the seat 24 and the leg-rest 30 such that the leg-rest 30 is maintained in a substantially horizontal position (compare FIGS. 3 and 4). It will be appreciated, however, that although the invention has been illustrated with two limit positions shown respectively in FIGS. 1 and 4, and two selected intermediate positions shown respectively in FIGS. 2 and 3, that there are an infinite number of intermediate positions wherein the leg-rest is optimumly positioned relative to the seat, which corresponding infinite number of positions occur, once the leg-rest is substantially elevated as shown in FIG. 2, to and including the fully reclined position shown in FIG. 4.

Specifically, the leg-rest control arrangement 36 which serves to actuate the leg-rest 30 and is controlled from the body-supporting means 20 includes a suspended control member or link 40. The control member 40 is mounted for movement relative to the support 12 on a first suspending link 42 which has a first pivotal mount 44 on the support 12 and a first pivotal connection 46 to the control member 40, and a second suspending link 48 which has a second pivotal mount 50 on the support 12 and a second pivotal connection 52 to the control member 40 at a point spaced from the pivotal connection 46. The control member is mounted to be displaced relative to the support, or stated in somewhat different terms, the control member is mounted for linear and curvilinear translation relative to the support. Coupling means are operatively connected to the leg-rest 30 and to the control member 40 which takes the form of a coupling or connecting link 54 connected to the control member 40 at a control pivot 56 spaced from the first and second pivotal connections 46, 52. The coupling link 54 has a pivotal connection 58 to the hanger arm or plate 32 at a point spaced from the hanger pivot 34. The control pivot 56 is positioned on the control member 40 and the control member is suspended by the suspending links 42, 48 such that the control pivot 56 moves rapidly at a substantially uniform rate in response to the first phase or portion of the reclining movement of the back-rest 22 to bring about a rapid movement of the leg-rest 30 to the elevated leg-supporting position shown in FIG. 2. The path of movement of the control pivot 56 may be best appreciated by reference to the composite schematic diagram of FIG. 5, wherein it is seen that the control pivot 56 moves along an approximately straight line path from the FIG. 1 position shown by the heavy full line to the FIG. 2 position shown by the dash line. Further, the control pivot 56 is positioned on the control member 40 and the control member is suspended such that the control pivot 56 moves in response to an initial increment of a second phase or portion of the motion of the back-rest 22 during which there is a sharp retardation of the rate of movement of the control pivot 56 to slow the elevation of the leg-rest 30 and establish the further elevated leg-supporting position shown in FIG. 3. The path of movement of the control pivot between the positions of FIG. 2 and FIG. 3 may be best appreciated by reference to the composite schematic diagram of FIG. 5, wherein it is seen that the control pivot 56 moves along a curved and forwardly directed path from the FIG. 2 position to the FIG. 3 position. Further, the control pivot 56 is positioned on the control member 40 and the control member 40 is suspended such that the reduced rate at which the control pivot 56 changes position during the latter portion of the second phase of the movement of the back-rest 22 brings about a decrease in the angle between the leg-rest 30 and the seat 24 such that the leg-rest 30 remains substantially in the required horizontal attitude, as may be appreciated by progressively inspecting FIGS. 3 and 4. The path of movement of the control pivot 56 between the positions of FIGS. 3 and 4 may be best appreciated by reference to the composite schematic diagram of FIG. 5, wherein it is seen that the control pivot 56 moves along a sharply curved and rearwardly directed path from the FIG. 3 position to the FIG. 4 position.

The leg-rest control arrangement 36 is actuated in this illustrative form of the invention by an actuating or connecting link 60 which extends between the depending extension 22a of the back-rest 22 and the front suspending link 48 and has a pivotal connection 62 at its rearward end to the depending extension 22a and a pivotal connection 64 at its forward end to the front suspending link 48 at a point spaced above the front pivotal mount 50. Accordingly, in response to the reclining movement of the back-rest 22, the depending extension 22a swings through an upward and forward arc about the pivotal mount 26 imparting a forward thrust to the actuating link 60 which turns the front suspending link 48 in the clockwise direction about the front pivotal mount 50, as may be appreciated by progressively inspecting FIGS. 1 to 4. It will thus be appreciated that the front suspending link 48 serves as a driver link, with the rear suspending link 42 serving as a follower link and with the control member 40 serving as a connecting link pivotally suspended on the driver and follower links and displaceable relative to the support.

Provision is made for continuously and uniformly inclining the seat 24 in response to the continuous and uniform reclining movement of the back-rest 22. In this illustrative embodiment, a seat control link 66 extends between the rear suspending link 42 and the seat 24 and is disposed in an upwardly and forwardly inclined attitude. The seat control link 66 has a pivotal connection 68 to the rear suspending link 42 at a point spaced below the pivotal mount 44 and a pivotal connection 70 to the seat 24 at a point spaced forwardly of the seat pivot 26. In the interests of simplicity and brevity, stops to establish limit positions for the body-supporting means, springs which may be required for balance and like mechanical expedients have not been illustrated and described, but their inclusion where appropirate is obvious to those skilled in the art.

In order to facilitate a more thorough understanding of the present invention, reference will now be made to a typical sequence of operations:

As the occupant is seated in the chair and leans against the back-rest 22 and urges weight rearwardly thereagainst, the back-rest 22 will begin to recline at a continuous and uniform rate. Such reclining movement is effective via the actuating link 60 to initiate the operation of the variable velocity leg-rest control arrangement 36, which via the coupling or connecting link 54 initially brings about a rapid movement of the leg-rest 30 to an elevated leg-supporting position, for example as shown in FIG. 2. Concurrently, the seat 24 is inclined under control of the seat control link 66. As may be appreciated by progressively inspecting FIGS. 1 and 2, the leg-rest 30 arrives at the elevated leg-supporting position in response to a relatively small reclining movement of the back-rest 22 and a correspondingly small inclining movement of the seat 24, with the seat 24 and back-rest 22 being oriented relative to each other and to the support 12 to establish a first intermediate position appropriate for television viewing, reading, sewing and like activities wherein it is desirable for the chair occupant to be disposed in a somewhat tilted back attitude with the legs elevated. As the chair occupant continues to exert pressure on the back-rest 22, further intermediate positions are established, for example as shown in FIG. 3, with the leg-rest 30 remaining in the optimum position relative to the seat 24. Continued reclining movement will ultimately bring the chair into the fully reclined position illustrated in FIG. 4, with an appropriate stop (not shown) being provided to preclude further rearward movement of the body-supporting means 20 of the chair 10. Although only two intermediate positions have been illustrated, it will be appreciated, particularly upon reference to FIG. 5, that there are an infinite number of intermediate positions wherein the leg-rest 30 is optimumly positioned relative to the seat 24 for the leg-supporting function, with the first of these positions occurring at a relatively early point in the rearward movement of the body-supporting means 20 of the chair as illustrated in FIG. 2.

In FIGS. 6 to 10 inclusive there is shown a second embodiment of reclining chair demonstrating features of the present invention, generally designated by the reference numeral 110, which includes a support or frame 112 having opposite side walls 114 interconnected by suitable cross braces 116 and supported on depending legs 118.

A body-supporting means, generally designated by the reference numeral 120 and including a back-rest 122 and a seat 124, is mounted on the support for movement from the upright sitting position illustrated in FIG. 6 through the intermediate positions illustrated in FIGS. 7 and 8 into the reclining position illustrated in FIG. 9. In this illustrative embodiment, the back-rest 122 is mounted at its lower end at a back-rest pivot 126 on the support 112 for reclining movement, and the seat 124 is mounted by means of the rearwardly directed rigid hanger 128 on the back-rest 122 for inclining movement about a seat pivot 129 which is spaced above the back-rest pivot 126.

Disposed beneath the forward end of the seat 124 in a depending stored position is a leg-rest 130 which is mounted for movement at varying rates from the stored position illustrated in FIG. 6 to elevated leg-supporting positions illustrated in FIGS. 7, 8 and 9. In this illustrative embodiment, the leg-rest 130 is mounted for movement into the successive elevated leg-supporting positions by a hanger arm or plate 132 which is rigidly connected to the upper end of the leg-rest 130 and is mounted on the seat 124 at a hanger pivot 134.

A leg-rest control arrangement 136 serves to actuate the leg-rest 130 and is controlled from the body-supporting means 120 and includes a suspended control member 140. The control member 140 is mounted for movement relative to the support 112 on a first suspending link 142 which has a first pivotal mount 144 on the support 112 and a first pivotal connection 146 to the control member 140 and one arm 148a of a double-arm lever 148 serving as a second suspending link which has a pivotal mount 150 intermediate its ends on the support 112. The second suspending link 148a has a pivotal connection 152 to the control member 140 at a point spaced rearwardly of the pivotal connection 146. Coupling means are operatively connected to the leg-rest 130 and to the control member 140 which takes the form of a coupling or connecting link 154 which is connected to the control member 140 at a control pivot 156 spaced from the first and second pivotal connections 146, 152. Further, the coupling link 154 has a pivotal connection 158 to the hanger arm or plate 132 at a point spaced from the hanger pivot 134. The control pivot 156 is positioned on the control member 140 and the control member is suspended by the suspending links 142, 148a such that the control pivot 156 moves rapidly at a substantially uniform rate in response to the first phase or portion of the reclining movement of the back-rest 122 to bring about a rapid movement of the leg-rest 130 to the elevated leg-supporting position shown in FIG. 7. The path of movement of the control pivot 156 may be best appreciated by reference to the composite schematic diagram of FIG. 10 wherein it is seen that the control pivot 156 moves along a substantially straight line path from the FIG. 6 position shown by the heavy full line to the FIG. 7 position shown by the dash line. Further, the control pivot 156 is positioned on the control member 140 and the control member is suspended such that the control pivot 156 moves in response to an initial increment of a second phase or portion of the motion of the back-rest 122 during which there is a sharp retardation of the rate of movement of the control pivot 156 to slow the elevation of the leg-rest 130 and establish the further elevated leg-supporting position shown in FIG. 8. The path of movement of the control pivot 156 between the positions of FIG. 7 and FIG. 8 may be best appreciated by reference to the composite schematic diagram of FIG. 10 wherein it is seen that the control pivot 156 moves along a curved path from the FIG. 7 position to the FIG. 8 position. Further, the control pivot 156 is positioned on the control member 140 and the control member 140 is suspended such that the reduced rate at which the control pivot 156 changes position during the latter portion of the second phase of the movement of the back-rest 122 brings about a decrease in the angle between the leg-rest 130 and the seat 124 such that the leg-rest 130 remains substantially in the required horizontal attitude, as may be appreciated by progressively inspecting FIGS. 8 and 9. The path of movement of the control pivot between the positions of FIGS. 8 and 9 may be best appreciated by reference to the composite schematic diagram of FIG. 10 wherein it is seen that the control pivot 156 moves along a curved and rearwardly directed path from the FIG. 8 position to the FIG. 9 position.

The leg-rest control arrangement 136 is actuated in this illustrative form of the invention by an actuating or connecting link 160 which extends between the seat 124 and the arm 148b of the double-arm lever 148 and has a pivotal connection 162 at its rearward end to the seat 124 and a pivotal connection 164 at its forward end to the arm 148b at a point spaced above the pivotal mount 150. Accordingly, in response to the inclining and rearward movement of the seat 124, the arm 148b swings through an upward and rearward arc about the pivotal mount 150 which turns the suspending link 148a in the counter-clockwise direction, as may be appreciated by progressively inspecting FIGS. 6 to 9. It will thus be appreciated that the suspending link 148a serves as a driver link, with the suspending link 142 serving as a follower link, and with the control member 140 serving as a connecting link pivotally suspended on the driver and follower links.

Provision is made for continuously and uniformly inclining the seat 124 in response to the continuous and uniform reclining movement of the back-rest 122. In this illustrative embodiment, a seat control link 166 extends between the support 112 and the seat 124 and is disposed in an upwardly and forwardly inclined attitude in the upright sitting position of the body-supporting means. The seat control link 166 has a pivotal mount 168 on the support 112 and a pivotal connection to the seat 124 coaxially with the pivotal connection 162. In the interests of simplicity and brevity stops to establish limit positions for the body-supporting means, springs which may be required for balance and like mechanical expedients have not been illustrated and described, but their inclusion where appropriate is obvious to those skilled in the art.

In order to facilitate a more thorough understanding of this embodiment of the present invention, reference will now to made to a typical sequence of operations:

As the occupant is seated in the chair and leans against the back-rest 122 and urges weight rearwardly thereagainst, the back-rest 122 will begin to recline at a continuous and uniform rate. Such reclining movement is effective via the seat 124 to initiate the operation of the leg-rest control arrangement 136, which via the coupling or connecting link 154 initially brings about a rapid movement of the leg-rest to an elevated leg-supporting position, for example as shown in FIG. 7. Concurrently, the seat 124 is inclined under control of the seat control link 166. As may be appreciated by progressively inspecting FIGS. 6 and 7, the leg-rest 130 arrives at the elevated leg-supporting position in response to a relatively small reclining movement of the back-rest 122 and a correspondingly small inclining movement of the seat 124, with the seat and back-rest being oriented relative to each other and to the support to establish a first intermediate position appropriate for television viewing, reading, sewing and like activities. As the chair occupant continues to exert pressure on the back-rest 122, further intermediate positions are established, for example as shown in FIG. 8, with the leg-rest 130 remaining in the optimum position relative to the seat. Continued reclining movement will ultimately bring the chair into the fully reclined position illustrated in FIG. 9, with an appropriate stop (not shown) being provided to preclude further rearward movement of the body-supporting means 120 of the chair 110.

In FIGS. 11 to 15 inclusive, there is shown a further embodiment of reclining chair demonstrating features of the present invention, generally designated by the reference numeral 210, which includes a support or frame 212 having opposite side walls 214 interconnected by suitable cross braces 216 and supported on depending legs 218.

A body-supporting means, generally designated by the reference numeral 220 and including a back-rest 222 and a seat 224, is mounted on the support for movement from the upright sitting position illustrated in FIG. 11 through the intermediate positions illustrated in FIGS. 12 and 13 into the fully reclining position illustrated in FIG. 14. In this illustrative embodiment, the back-rest 222 is mounted at its lower end at a back-rest pivot 226 on the support 212 for reclining movement, and the seat 224 is mounted by means of the rearwardly directed rigid hanger 228 on the back-rest 222 for inclining movement about a seat pivot 229 which is spaced above the back-rest pivot 226.

Disposed beneath the forward end of the seat 224 in a depending stored position is a leg-rest 230 which is mounted for movement at varying rates from the stored position illustrated in FIG. 11 to elevated leg-supporting positions illustrated in FIGS. 12, 13 and 14. In this illustrative embodiment, the leg-rest 230 is mounted for movement into the successive elevated leg-supporting positions by a hanger arm or plate 232 which is rigidly connected to the upper end of the leg-rest and is mounted on the seat 224 at a hanger pivot 234.

A leg-rest control arrangement 226, which serves to actuate the leg-rest 230, is controlled from the body-supporting means 220 and includes a suspended control member 240. The control member 240 is movably mounted for movement relative to the support 212 on a first suspending link 242 which has a first pivotal mount 244 on the support 212 and a first pivotal connection 246 to the control member 240 and one arm 248a of a double arm lever 248 serving as a second suspending link which has a second pivotal mount 250 intermediate its ends on the support. The second suspending link 248a has a pivotal connection 252 to the control member 240 at a point spaced rearwardly of the pivotal connection 246. Coupling means are operatively connected to the leg-rest 230 and to the control member 240 which take the form of a coupling link 254 which is connected to the control member 240 at a control pivot 256 spaced from the first and second pivotal connections 246, 252. Further, the coupling or connecting link 254 has a pivotal connection 258 to the hanger arm or plate 232 at a point spaced from the hanger pivot 234. The control pivot 256 is positioned on the control member 240 and the control member is suspended by the suspending links 242, 248 such that the control pivot 256 moves rapidly at a substantially uniform rate in response to the first phase or portion of the reclining movement of the back-rest 222 to bring about a rapid movement of the leg-rest 230 to the elevated leg-supporting position shown in FIG. 12. The path of movement of the control pivot 256 may be best appreciated by reference to the composite schematic diagram of FIG. 15 wherein it is seen that the control pivot 256 moves along a substantially straight line path from the FIG. 11 position shown by the heavy full line to the FIG. 12 position shown by the dash line. Further, the control pivot 256 is positioned on the control member 240 and the control member is suspended such that the control pivot 256 moves in response to an initial increment of a second phase or portion of the motion of the back-rest 222 during which there is a sharp retardation of the rate of movement of the control pivot 256 to slow the elevation of the leg-rest 230 and establish the further elevated leg-supporting position shown in FIG. 13. The path of movement of the control pivot between the positions of FIG. 12 and FIG. 13 may be best appreciated by reference to the composite schematic diagram of FIG. 15, wherein it is seen that the control pivot 256 moves along a curved and forwardly directed path from the FIG. 12 position to the FIG. 13 position. Further, the control pivot 256 is positioned on the control member 240 and the control member 240 is suspended such that the reduced rate at which the control pivot 256 changes position during the latter portion of the second phase of the movement of the back-rest 222 brings about a decrease in the angle between the leg-rest 230 and the seat 224, such that the leg-rest 230 remains substantially in the required horizontal attitude, as may be appreciated by progressively inspecting FIGS. 13 and 14. The path of movement of the control pivot between the positions of FIGS. 13 and 14 may be best appreciated by reference to the composite schematic diagram of FIG. 15 wherein it is seen that the control pivot 256 moves along a sharply curved and rearwardly directed path from the FIG. 13 position to the FIG. 14 position.

The leg-rest control arrangement 236 is actuated by the arm 248b of the double arm lever 248 which serves as an actuating or connecting link. The actuating or connecting link 248b has a pin and slot interconnection 260, 262 to the seat 224 at a point spaced forwardly of the seat pivot 229. The slot 262 is formed in the link 248b while the pin 260 is fixed to the seat and is disposed at the lower end of the slot in the sitting position of the chair, with the pin translating upwardly in the slot during their movement. The pin and slot interconnection 260, 262 serves as a flexible coupling between the double-arm lever 248 and the seat 224 and is effective in response to the rearward and inclining movement of the seat 224 to actuate the leg-rest control arrangement 236.

Provision is made for continuously and uniformly inclining the seat 224 in response to the continuous and uniform reclining movement of the back-rest 222. In this illustrative embodiment, a seat control link 266 extends between the support 212 and the seat 224 and is disposed in an upwardly and forwardly inclined attitude. The seat control link 266 has a pivotal mount 268 on the support 212 and a pivotal connection 270 to the seat 24 at a point spaced forwardly of the seat pivot 229. A stop 272 is provided to establish a starting position for the seat control link 266 which turns in the counterclockwise direction about the pivotal mount 268. In the interests of simplicity and brevity, stops to establish limit positions for the body-supporting means, springs which may be required for balance and like mechanical expedients have not been illustrated and described, but their inclusion where appropriate is obvious to those skilled in the art.

In order to facilitate a more thorough understanding of this embodiment of the present invention, reference will now be made to a typical sequence of operations:

As the occupant is seated in the chair and leans against the back-rest 222 and urges weight rearwardly thereagainst, the back-rest 222 will begin to recline at a continuous and uniform rate. Such reclining movement is effective via the seat 224, the pin and slot interconnection 260, 262 and link 248b to initiate the operation of the leg-rest control arrangement 236, which via the coupling or connecting link 254 initially brings about a rapid movement of the leg-rest to an elevated leg-supporting position, for example as shown in FIG. 12. Concurrently the seat 224 is inclined under control of the seat control link 266 which turns about the pivotal mount 268. As may be appreciated by progressively inspecting FIGS. 11 and 12, the leg-rest arrives at the elevated leg-supporting position in response to a relatively small reclining movement of the back-rest and a correspondingly small inclining movement of the seat 224, with the seat and back-rest being oriented relative to each other and to the support to establish a first intermediate position appropriate for television viewing, reading, sewing and like activities. As the chair occupant continues to exert pressure on the back-rest 222, further intermediate positions are established, for example as shown in FIG. 13, with the leg-rest 230 remaining in the optimum position relative to the seat, and with increasing included angles between the back-rest 222 and the seat 224. Continued reclining movement will ultimately bring the chair into the fully reclined position illustrated in FIG. 14, with an appropriate stop (not shown) being provided to preclude further rearward movement of the body-supporting means 220 of the chair 210.

In FIGS. 16 to 20 inclusive there is shown a further embodiment of reclining chair demonstrating features of the present invention, generally designated by the reference numeral 310, which includes a support or frame 312 having opposite side walls 314 interconnected by suitable cross braces 316 and supported on depending legs 318.

A body-supporting means, generally designated by the reference numeral 320 and including a back-rest 322 and a seat 324, is mounted on the support for movement from the upright sitting position illustrated in FIG. 16 through the intermediate positions illustrated in FIGS. 17 and 18 into the reclining position illustrated in FIG. 19. In this illustrative embodiment, the back-rest 322 includes a depending extension 322a and is mounted on the support 312 at a back-rest pivot 326 for reclining movement. The seat 324 is mounted on the depending extension 322a by means of the rearwardly directed rigid hanger 328 for inclining movement about a seat pivot 329 which is spaced below the back-rest pivot 326.

Disposed beneath the forward end of the seat 324 in a depending stored position is a leg-rest 330 which is mounted for movement at varying rates from the stored position illustrated in FIG. 16 to elevated leg-supporting positions illustrated in FIGS. 17, 18 and 19. In this illustrative embodiment the leg-rest 330 is mounted for movement into the successive elevated leg-supporting positions by a hanger arm or plate 332 which is rigidly connected to the upper end of the leg-rest 330 and is mounted on the seat 324 at a hanger pivot 334.

A leg-rest control arrangement 336, which serves to actuate the leg-rest 330, is controlled from the body-supporting means 320 and includes a suspended control member 340. The control member 340 is movably mounted for movement relative to the support on a first suspending link 342 which has a first pivotal mount 344 on the support 312 and a first pivotal connection 346 to the control member 340, and a second suspending link 348 which has a second pivotal mount 350 on the support and a second pivotal connection 352 to the control member 340 at a point spaced from the pivotal connection 346. Coupling means are operatively connected to the leg-rest 330 and to the control member 340 which take the form of a coupling or connecting link 354 which is connected to the control member 340 at a control pivot 356 spaced from the first and second pivotal connections 346, 352 and which has a pivotal connection 358 to the hanger arm or plate 332 at a point spaced from the hanger pivot 334. The control pivot 356 is positioned on the control member 340 and the control member is suspended by the suspending links 342, 438 such that the control pivot 356 moves rapidly at a substantialy uniform rate in response to the first phase or portion of the recining movement of the back-rest 322 to bring about a rapid movement of the leg-rest 330 to the elevated leg-supporting position shown in FIG. 17. The path of movement of the control pivot 356 may be best appreciated by reference to the composite schematic diagram of FIG. 20 wherein it is seen that the control pivot 356 moves along a substantially straight line path from the FIG. 16 position shown by the heavy full line to the FIG. 17 position shown by the dash line. Further, the control pivot 356 is positioned on the control member 340 and the control member is suspended such that the control pivot 356 moves in response to an initial increment of a second phase or portion of the motion of the back-rest 322 during which there is a sharp retardation in the rate of movement of the control pivot 356 to slow the elevation of the leg-rest 330 and establish the further elevated leg-supporting position shown in FIG. 18. The path of movement of the control pivot between the positions of FIG. 17 and FIG. 18 may be best appreciated by reference to the composite schematic diagram of FIG. 20 wherein it is seen that the control pivot 356 moves along a changed direction path from the FIG. 17 position to the FIG. 18 position. Further, the control pivot 356 is positioned on the control member 340 and the control member 340 is suspended such that the reduced rate at which the control pivot 256 changes position during the latter portion of the second phase of the movement of the back-rest 322 brings about a decrease in the angle between the leg-rest 330 and the seat 324, such that the leg-rest 330 remains substantially in the required horizontal attitude, as may be appreciated by progressively inspecting FIGS. 18 and 19. The path of movement of the control pivot 356 between the positions of FIGS. 18 and 19 may be best appreciated by reference to the composite schematic diagram of FIG. 20, wherein it is seen that the control pivot 356 moves along a sharply curved path from the FIG. 18 position to the FIG. 19 position.

The leg-rest control arrangement 336 is actuated by a direct pivotal connection 360 between the suspending link 348 and a seat bracket 362 fixed to the undersurface of the seat. In this illustrative embodiment, the suspending link 348 intermediate the pivotal mount 350 and the pivotal connection 360 serves as the seat control means.

In response to the reclining movement of the back-rest 322, the depending extension 322a swings through an upward and forward arc about the pivotal mount 326 imparting a forward and upward thrust to the link 348 which turns in the clockwise direction about the front pivotal mount 350, as may be appreciated by progressively inspecting FIGS. 16 to 19. The front suspending link 348 serves as a driver link with the rear suspending link 342 serving as a follower link, and with the control member 340 serving as a connecting link pivotally suspended on the driver and follower links. In the interests of simplicity and brevity, all stops necessary to establish limit positions for the body-supporting means, springs which may be required for balance and like mechanical expedients have not been illustrated and described, but their inclusion where appropriate is obvious to those skilled in the art.

In order to facilitate a more thorough understanding of this embodiment of the present invention, reference will now be made to a typical sequence of operations:

As the occupant is seated in the chair and leans against the back-rest 322 and urges weight rearwardly thereagainst, the back-rest 322 will begin to recline at a continuous and uniform rate. Such reclining movement is effective via the seat 324 intermediate the pivots 329, 360, serving as an actuating link to initiate the operation of the leg-rest control arrangement 336, which via the coupling or connecting link 354 initially brings about a rapid movement of the leg-rest 330 to an elevated leg-supporting position, for example as shown in FIG. 17. Concurrently, the seat 324 is inclined under control of the seat control link intermediate pivots 350, 360. As may be appreciated by progressively inspecting FIGS. 16 and 17, the leg-rest arrives at the elevated leg-supporting position in response to a relatively small reclining movement of the back-rest and a correspondingly small inclining movement of the seat 324, with the seat and back-rest being oriented relative to each other and to the support to establish a first intermediate position appropriate for television viewing, reading, sewing and like activities. As the chair occupant continues to exert pressure on the back-rest 322, further intermediate positions are established, for example as shown in FIG. 18, with the leg-rest 330 remaining in the optimum position relative to the seat, and with progressively increasing included angles between the back-rest 322 and the seat 324. Continued reclining movement will ultimately bring the chair into the fully reclined position illustrated in FIG. 19, with an appropriate stop (not shown) being provided to preclude further rearward movement of the body-supporting means 320 of the chair 310.

In FIGS. 21 to 24 inclusive there is shown a still further embodiment of reclining chair of the rester type including a unitary seat and back-rest and demonstrating features of the present invention generally designated by the reference numeral 410, which includes a support or frame 412 having opposite side walls 414 interconnected by suitable cross braces 416 and supported on depending legs 418.

A rigid body-supporting unit, generally designated by the reference numeral 420 and including a back-rest 422 and a seat 424, is mounted on the support 412 at a pivotal mount 426 for movement from the upright sitting position illustrated in FIG. 21 through the intermediate, tilted sitting position illustrated in FIG. 22 into the full tilted or reclining position illustrated in FIG. 23.

Disposed beneath the forward end of the seat 424 in a depending stored position is a leg-rest 430 which is mounted for movement at varying rates from the stored position illustrated in FIG. 21 to elevated leg-supporting positions illustrated in FIGS. 22 and 23. The leg-rest 430 is mounted for movement into the successive elevated leg-supporting positions by a double four-bar mounting linkage 432 which is of known construction, for example as disclosed in U.S. Patent Nos. 2,914,114, 2,921,624 and 2,932,346, all assigned to the assignee of the instant application. The mounting linkage 464 includes a link 466 which has a pivotal mount 468 on the seat 424 and is pivotally connected at 470 to a further link 472 which has a pivotal connection 474 to the leg-rest 430. The mounting linkage 464 further includes a link 478 which has a pivotal mount 480 on the seat 424 forwardly of the pivotal mount 468, a pivotal connection 476 to the link 472 at the cross-over thereof, and a pivotal connection 482 to a further link 484 which has a pivotal connection 486 to the leg-rest 430 at a point spaced from the pivotal connection 474.

A leg-rest control arrangement 436, which serves to actuate the leg-rest 430, is controlled from the body-supporting unit 420 and includes a suspended control member 440. The control member 440 is mounted for movement relative to the support 412 on a first suspending link 442 which has a first pivotal mount 444 on the support 412 and a first pivotal connection 456 to the control member 440 and a second suspending link 448 which has a second pivotal mount 450 on the support 412 and a second pivotal connection 452 to the control member 440 at a point spaced from the pivotal connection 456. Coupling means are operatively connected to the leg-rest 430 and to the control member 440 which take the form of a coupling or connecting link 454 which is connected to the control member 440 at a control pivot coaxially with the pivotal connection 456 and spaced from the pivotal connections 452 and which has a pivotal connection 458 to the link 432a at a point spaced from the pivot 432e. The control pivot 456 is positioned on the control member 440 and the control member is suspended by the suspending links 442, 448 such that the control pivot 456 moves rapidly at a substantially uniform rate in response to the first phase or portion of the rearward movement of the body-supporting unit 420 to bring about a rapid movement of the leg-rest 430 to the elevated leg-supporting position shown in FIG. 22. The path of movement of the control pivot 456 may be best appreciated by reference to the composite schematic diagram of FIG. 24 wherein it is seen that the control pivot 456 moves from the FIG. 21 position shown by the heavy full line to the FIG. 22 position shown by the dash line. Further, the control pivot 456 is positioned on the control member 440 and the control member 440 is suspended such that the control pivot 456 moves in response to an initial increment of a second phase or portion of the motion of the back 422 during which there is a sharp retardation of the rate of movement of the control pivot 456 to slow the elevation of the leg-rest 430 and establish the further elevated leg-supporting position shown in FIG. 23. The path of movement of the control pivot 456 between the positions of FIG. 22 and FIG. 23 may be best appreciated by reference to the composite schematic diagram of FIG. 24 wherein it is seen that the control pivot 456 moves along a sharply curved path from the FIG. 22 position to the FIG. 23 position.

The leg-rest control arrangement 436 is actuated in this illustrative form of the invention by an actuating or connecting link 460 which extends between the seat 424 of the body-supporting unit and the pivotal connection 452 between the front suspending link 448 and the control member 440. The actuating link 460 has a pivotal connection 462 at its upper end to the seat 424 and a pivotal connection at its lower end to the link 448 and the control member 440 coaxially with the pivotal connection 452. Accordingly, in response to the rearward movement of the body-supporting unit 420, the actuating link 460 is pulled upwardly and rearwardly which turns the front suspending link 448 in the clockwise direction about the front pivotal mount 450, as may be appreciated by progressively inspecting FIGS. 21 to 23. In the interests of simplicity and brevity, stops to establish limit positions for the body-supporting means, springs which may be required for balance and like mechanical expedients have not been illustrated and described, but their inclusion where appropriate is obvious to those skilled in the art.

In order to facilitate a more thorough understanding of this embodiment of the present invention, reference will now be made to a typical sequence of operations:

As the occupant is seated in the chair and leans against the back-rest 422 and urges weight rearwardly thereagainst, the body-supporting unit 420 will tilt rearwardly about its pivotal mount 426. Such movement is effective via the actuating link 460 to initiate the operation of the leg-rest control arrangement 436, which via the coupling or connecting link 454 initially brings about a rapid movement of the leg-rest 430 to an elevated leg-supporting position, for example as shown in FIG. 22. As may be appreciated by progressively inspecting FIGS. 21 and 22, the leg-rest 430 arrives at the elevated leg-supporting position in response to a relatively small tilting movement of the body-supporting unit 420 which is oriented relative to the support to establish an intermediate, tilted sitting position appropriate for television viewing, reading, sewing and like activities wherein it is desirable for the chair occupant to be disposed in a somewhat tilted back attitude with the legs elevated. As the chair occupant continues to exert pressure on the back-rest 422, further intermediate positions are established, with the leg-rest 430 remaining in the optimum position relative to the seat of the body-supporting unit 423. Continued movement will ultimately bring the chair into the fully tilted back or reclined position illustrated in FIG. 23, with an appropriate stop (not shown) being provided to preclude further movement of the body-supporting unit 20 of the chair 10. Although only one intermediate tilted position has been illustrated, it will be appreciated, particularly upon reference to FIG. 24, that there are an infinite number of intermediate tilted positions wherein the leg-rest is optimumly positioned relative to the seat of the body-supporting unit for the leg-supporting function, with the first of these positions occurring at a relatively early point in the rearward movement of the body-supporting unit of the chair.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. An improved leg-rest control arrangement for a reclining chair of the type including a support, body-supporting means including a back-rest and seat movably mounted on said support, a leg-rest, and means operatively connected to and mounting said leg-rest for movement into various elevated leg-supporting positions, said arrangement comprising leg-rest actuating means operatively coupling said leg-rest with said body-supporting means, said actuating means including a suspended control member, first and second suspending means mounted on said support and carrying said control member therebetween, said suspending means guiding said control member for displacement relative to said support, means operatively connecting said suspending means to said body-supporting means for displacement of said control member in response to movement of said body-supporting means, and coupling means operatively connecting a control pivot on said control member to said leg-rest, said suspending means being connected at such spaced points on the control member and said control pivot being so spaced from said spaced points as to cause said leg-rest to initially move rapidly at a first rate in response to a first phase of the movement of said body-supporting means and then to move at a second and less rapid rate in response to a second phase of movement of said body-supporting means, the movement of said control pivot at said first rate during said first phase being effective to rapidly move said leg-rest into an elevated leg-supporting position and the movement of said control pivot at said second rate during said second phase being effective to maintain said leg-rest in an elevated leg-supporting position.

2. An improved leg-rest control arrangement for a reclining chair of the type including a support, body-supporting means including a back-rest and seat movably mounted on said support, a leg-rest, and means operatively connected to and mounting said leg-rest for movement into various elevated leg-supporting positions, said arrangement comprising leg-rest actuating means operatively coupling said leg-rest with said body-supporting means, said actuating means including a freely suspended control member, first and second suspending links pivotally mounted on said support and carrying said control member therebetween, said suspending means guiding said control member for displacement relative to said support, means operatively connecting said suspending means to said body-supporting means for displacement of said control member in response to movement of said body-supporting means, and coupling means operatively connecting a control pivot on said control member to said leg-rest, said suspending means being connected at such spaced points on the control member and said control pivot being so spaced from said spaced points as to cause said leg-rest to initially move rapidly in response to a first phase of the movement of said body-supporting means and then to be retarded to slow down the rate of elevation of said leg-rest in response to a second phase of movement of said body-supporting means, the movement of said control pivot during said first phase being effective to rapidly move said leg-rest into an elevated leg-supporting position and the movement of said control pivot at the retarded rate during said second phase being effective to maintain said leg-rest in an elevated leg-supporting position.

3. An improved leg-rest control arrangement for a reclining chair of the type including a support, body-supporting means including a back-rest and seat movably mounted on said support, a leg-rest, and means operatively connected to and mounting said leg-rest for movement into various elevated leg-supporting positions, said arrangement comprising leg-rest actuating means operatively coupling said leg-rest with said body-supporting means, said actuating means including a suspended control member, first and second suspending means mounted on said support and carrying said control member therebetween, said suspending means guiding said control member for displacement relative to said support, means operatively connecting said suspending means to said body-supporting means for displacement of said control member in response to movement of said body-supporting means, and coupling means operatively connecting a control pivot on said control member to said leg-rest, said suspending means being connected at such spaced points on the control member and said control pivot being so spaced from said spaced points as to cause said leg-rest to initially move rapidly at a substantially uniform rate in response to a first phase of the movement of said body-supporting means and then to be rapidly retarded to slow down the rate of elevation of said leg-rest in response to a second phase of movement of said body-supporting means, the movement of said control pivot during said first phase being effective to rapidly move said leg-rest into an elevated leg-supporting position and the movement of said control pivot at the retarded rate during said second phase being effective to maintain said leg-rest in an elevated leg-supporting position.

4. An improved leg-rest control arrangement for a reclining chair of the type including a support, a body-supporting means including a back-rest and seat movably mounted on said support, a leg-rest, and means operatively connected to and mounting said leg-rest for movement into various elevated leg-supporting positions, said arrangement comprising leg-rest actuating means operatively coupling said leg-rest with said body-supporting means, said actuating means including a suspended control member, first and second suspending means mounted on said support and carrying said control member therebetween, said suspending means guiding said control member for displacement relative to said support, means operatively connecting said suspending means to said body-supporting means for displacement of said control member in response to movement of said body-supporting means, and coupling means operatively connecting a control pivot on said control member to said leg-rest, said suspending means being connected at such spaced points on the control member and said control pivot being so spaced from said spaced points as to cause said leg-rest to initially move rapidly in response to a first phase of the movement of said body-supporting means and then to be retarded to slow down the rate of elevation of said leg-rest in response to a second phase of movement of said body-supporting means, the movement of said control pivot during said first phase being effective to rapidly move said leg-rest into an elevated leg-supporting position and the movement of said control pivot at the retarded rate during said second phase being effective to maintain said leg-rest in an elevated leg-supporting position, the retardation in the rate of elevation of said leg-rest during said second phase of movement of said body-supporting means being effective to bring about a decrease in the angle between said leg-rest and seat during the latter portion of said second phase of movement such that an optimum elevating leg-supporting position is maintained as said body-supporting means moves into a fully reclined position.

5. An improved leg-rest control arrangement for a reclining chair of the type including a support, body-supporting means including a back-rest and seat movably mounted on said support, a leg-rest, and means operatively connected to and mounting said leg-rest for movement into various elevated leg-supporting positions, said arrangement comprising leg-rest actuating means operatively coupling said leg-rest with said body-supporting means, said actuating means including a suspended control link, first and second suspending means pivotally mounted on said support at first and second pivotal mounts and having first and second pivotal connections to said control link for mounting the same for displacement relative to said support, means operatively connecting said suspending means to said body-supporting means for displacement of said control member in response to movement of said body-supporting means, and coupling means operatively connecting a control pivot on said control member to said leg-rest, said suspending means being connected at such spaced points on the control member and said control pivot being so spaced from said spaced points as to cause said leg-rest to initially move rapidly in response to a first phase of the movement of said body-supporting means and then to be retarded to slow down the rate of elevation of said leg-rest in response to a second phase of movement of said body-supporting means, the movement of said control pivot during said first phase being effective to rapidly move said leg-rest into an elevated leg-supporting position and the movement of said controlled point at the retarded rate during said second phase being effective to maintain said leg-rest in an elevated leg-supporting position.

6. An improved leg-rest control arrangement for a reclining chair of the type including a support, body-supporting means including a back-rest and seat movably mounted on said support, a leg-rest, and means operatively connected to and mounting said leg-rest for movement into various elevated leg-supporting positions, said arrangement comprising leg-rest actuating means operatively coupling said leg-rest with said body-supporting means, said actuating means including a suspended control link, first and second suspending links pivotally mounted on said support at first and second pivotal mounts and having first and second pivotal connections to said control link for mounting the same for displacement relative to said support, means operatively connecting said suspending means to said body-supporting means for displacement of said control member in response to movement of said body-supporting means, and coupling means operatively connecting a control pivot on said control member to a controlled point on said leg-rest, said suspending means being connected at such spaced points on the control member and said control pivot being so spaced from said spaced points as to cause said leg-rest to initially move rapidly in response to a first phase of the movement of said body-supporting means and then to be retarded to slow down the rate of elevation of said leg-rest in response to a second phase of movement of said body-supporting means, the movement of said control pivot during said first phase being effective to rapidly move said leg-rest into an elevated leg-supporting position and the movement of said control pivot at the retarded rate during said second phase being effective to maintain said leg-rest in an elevated leg-supporting position, the retardation in the rate of elevation of said leg-rest during said second phase of movement of said body-supporting means being effective to bring about a decrease in the angle between said leg-rest and seat during the latter portion of said second phase of movement such that an optimum elevating leg-supporting position is maintained as said body-supporting means moves into a fully reclined position.

7. A reclining chair comprising a support, body-supporting means including a back-rest and seat movably mounted on said support for reclining and inclining movement respectively for movement from a sitting position through intermediate positions to a fully reclined position, a leg-rest, means operatively connected to and mounting said leg-rest for movement into various elevated leg-supporting positions, seat control means operatively connected to said seat and controlled from said back-rest for imparting an inclination to said seat during a first portion of said reclining movement of said back-rest to establish a first intermediate position for said body-supporting means, and a leg-rest actuating linkage pivotally connected to said leg-rest and controlled from said body-supporting means for moving said leg-rest to a first elevated leg-supporting position in response to said first portion of said reclining movement of said back-rest, said leg-rest actuating linkage including a suspended control link, respective first and second suspending links pivotally mounted on said support and having first and second spaced pivotal connections to said control link for mounting the same for movement relative to said support, coupling means pivotally connected to said leg-rest and to said control link at a control pivot, said control pivot being positioned on said control link and said control link being suspended such that said control pivot moves rapidly in response to said first portion of said reclining movement of said back-rest to bring about a rapid movement of said leg-rest to said first elevated leg-supporting position, said control pivot being positioned on said control link and said control link being suspended such that said control pivot has a further motion in response to a further portion of said reclining movement of said back-rest during which the rate of movement of said control pivot is retarded to slow down the rate of elevation of said leg-rest to establish a second elevated leg-supporting position.

8. A reclining chair according to claim 7 wherein said seat control means includes a seat control link pivotally mounted on one of said suspending links and pivotally connected to said seat.

9. A reclining chair according to claim 7 wherein said seat control means includes a seat control link pivotally mounted on said support and pivotally connected to said seat.

10. A reclining chair according to claim 7 including a further pivotal connection between one of said suspending links and said seat, the portion of said one suspending link intermediate its pivotal mount and said further pivotal connection serving as a seat control link.

11. A reclining chair according to claim 7 including means coupling said actuating linkage to said back-rest.

12. A reclining chair according to claim 7 including means coupling said actuating linkage to said seat.

References Cited in the file of this patent

UNITED STATES PATENTS

| | | |
|---|---|---|
| Re. 24,760 | Lorenz | Dec. 29, 1959 |
| 2,660,225 | Luckhardt | Nov. 24, 1953 |
| 2,679,285 | Luckhardt | May 25, 1954 |
| 2,746,521 | Lorenz | May 22, 1956 |
| 2,760,554 | Lorenz | Aug. 28, 1956 |
| 2,871,917 | Schliephacke | Feb. 3, 1959 |
| 2,909,214 | Schliephacke | Oct. 20, 1959 |
| 2,929,440 | Schliephacke | Mar. 22, 1960 |

FOREIGN PATENTS

| | | |
|---|---|---|
| 629,617 | Canada | Oct. 24, 1961 |